US008797615B2

(12) United States Patent
Itagaki

(10) Patent No.: US 8,797,615 B2
(45) Date of Patent: Aug. 5, 2014

(54) IMAGE FORMING APPARATUS

(71) Applicant: Canon Kabushiki Kaisha, Tokyo (JP)

(72) Inventor: Tomohisa Itagaki, Abiko (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/835,515

(22) Filed: Mar. 15, 2013

(65) Prior Publication Data

US 2013/0271794 A1 Oct. 17, 2013

Related U.S. Application Data

(63) Continuation of application No. PCT/JP2009/065459, filed on Aug. 28, 2009, and a continuation of application No. 13/035,371, filed on Feb. 25, 2011, now Pat. No. 8,432,579.

(30) Foreign Application Priority Data

Aug. 28, 2008 (JP) ................................. 2008-220568

(51) Int. Cl.
*H04N 1/405* (2006.01)

(52) U.S. Cl.
USPC ............................ 358/521; 358/523; 358/461

(58) Field of Classification Search
USPC ................. 358/1.9, 2.1, 521–530, 461, 3.06, 358/3.1–3.14, 3.21
See application file for complete search history.

(56) References Cited

U.S. PATENT DOCUMENTS

| 5,731,884 | A | 3/1998 | Inoue |
| 6,204,930 | B1 | 3/2001 | Inoue |
| 6,927,876 | B1 | 8/2005 | Kondo |
| 7,995,941 | B2 * | 8/2011 | Ozawa ............................. 399/49 |
| 2004/0199862 | A1 * | 10/2004 | Kobayashi et al. ............ 715/500 |
| 2005/0220469 | A1 * | 10/2005 | Fujita et al. ...................... 399/49 |
| 2011/0164285 | A1 | 7/2011 | Itagaki |

FOREIGN PATENT DOCUMENTS

| JP | 1-309082 A | 12/1989 |
| JP | 2000-039748 A | 2/2000 |
| JP | 2000-211187 A | 8/2000 |
| JP | 2001-119595 A | 4/2001 |
| JP | 2001-353851 A | 12/2001 |
| JP | 2004-289200 A | 10/2004 |
| JP | 2006-165752 A | 6/2006 |
| JP | 2006-166327 A | 6/2006 |
| JP | 2006-222804 A | 8/2006 |

OTHER PUBLICATIONS

International Search Report issued in International application No. PCT/JP09/065459 dated Dec. 8, 2009. Cited in the Parent case, U.S. Appl. No. 13/035,371.
Chinese Office Action for Chinese Patent Application No. 200980133358.9 dated Feb. 4, 2013.
Office Action issued in Counterpart Japanese Patent Application No. 2012-040669 dated Nov. 12, 2013, English abstract provided.

* cited by examiner

*Primary Examiner* — Thomas D Lee
*Assistant Examiner* — Stephen M Brinich
(74) *Attorney, Agent, or Firm* — Rossi, Kimms & McDowell LLP

(57) ABSTRACT

An image forming apparatus includes an image forming station for forming a pattern image on a recording material; an image reading station for reading a pattern image formed on a recording material by the image forming station; and a tone gradation corrector for calculating a halftone dot area property on the basis of the density of the pattern image read by the image reading station and for executing tone gradation correction in the image forming station on the basis of the calculated halftone dot area property.

16 Claims, 35 Drawing Sheets

IMAGE FORMING APPARATUS

CROSS-REFERENCE TO RELATED APPLICATION

This is a continuation of International Application PCT/JP2009/065459 having an international filing date of 28 Aug. 2009, which is based on and claims priority from Japanese Patent Application No. 2008-220568 filed on Aug. 28, 2008. The contents of each, in their entirety, including the drawings, claims, and the specification thereof, are incorporated herein by reference.

FIELD OF THE INVENTION

The present invention relates to an image forming apparatus for forming an image on a recording material, such as a copying machine or a printer of an electrophotographic type.

BACKGROUND ART

As shown in FIG. 30, output information (RGB image gray gradation image, CMYK image data) from a personal computer (PC) is supplied to the image processor provided in or connected with the image forming apparatus. In the image forming station, the output information from the PC is processed by a gamma correction portion for making correction in accordance with the gamma condition set by the printer driver depending on the user preferable, a converting portion to L*a*b* (only L* for gray), a converter to), C'M'Y'K'.

A color space conversion from a many dimension to a many dimension, for example, from RGB to L*a*b* or the like, is effected by the image processor using a multi-dimensional conversion table information of an ICC profile.

Referring to FIG. 31, there is shown a color setting portion of a printer driver which is a user interface (UI) provided for the user set a desired tone gradation. On the basis of the set point information, the gamma correction portion effects a gamma conversion using a unidimensional LUT.

Referring to FIG. 30, the image data converted to the C'M'Y'K' information is subjected further to a unidimensional LUT process by the engine tone gradation corrector. The engine tone gradation corrector is effective to keep the constant tone gradient of the printer engine. The state of the engine is detected using a patch image outputted on the recording material, that is, the sheet, and a unidimensional LUT is produced so as to provide a predetermined tone gradation curve. A stabilization control in which a patch outputted on the sheet thereafter is called automatic tone gradation correction.

A pseudo-half-tone processing portion functions to reproduce a half-tone using a dither method or the like. Since the engine tone gradation property is different depending on the kind (line number and/or dot growth method) of the half-tone, the tone gradation corrector is provided with a LUT for each of half-tone processes.

A technique assuring the stabilization property of color using the engine tone gradation corrector has been proposed.

Japanese Laid-open Patent Application Hei 1-309082, for example, a patch pattern for toner content detection formed on the photosensitive member is read by a density sensor, and the read information is fed-back to the toner content controller in the developing device to provide a proper density.

Generally, such a toner patch is easy to produce and erase, but what is obtained thereby is only density information prior to image fixing, and therefore, when the control based on the toner patch is carried out, the influence of the secondary transfer or the fixing step are not reflected.

Japanese Laid-open Patent Application Hei 1-309082 proposes that an image is read by a reader portion of a copying machine main assembly, and on the basis of the result of the reading, the image formation is controlled. With this method, the output print provided by fixing the toner on the sheet is read by the reader portion.

As a result of printing on standard, non-standard paper A (smooth thin paper), non-standard paper B (rough thick paper) under constant image forming conditions (charging, latent image and developing conditions), the density values detected by the reader portion are as shown in FIG. 32. On the basis of this information, a LUT shown in FIG. 33 is produced to provide a density.

The read density value is different depending on the paper surface of property, whiteness degree, thickness or the like, even if the toner amount thereon is the same, and therefore, the LUT varies. The LUT prepared on the basis of the non-standard paper B is lower in the maximum density than the target, and therefore, after input value of 240, data of 255 is used, for all. Therefore, over 240th level, the signal value exhibits no tone gradation. This is critical defect for the user who takes the tone gradient in the shadow portion in such a range important.

In addition, when the LUT is prepared on the basis of the non-standard paper A, the signal of 255 is outputted around the level of 240. Therefore, in the case of a signal indicative of solid image (halftone dot area percentage is 100%), a halftone process pattern appears with the result that quality deterioration, and/or jaggy patterns (screen patterns) appear at edge portions. Thus, the quality of letters and/or lines deteriorates.

In order to solve such a problem, Japanese Laid-open Patent Application 2006-165752 proposes that when the input signal is 255 (halftone dot area percentage is 100), the OUT side of the LUT is made 255, thus providing a certain degree of tone gradation.

FIG. 34 shows a LUT prepared on the basis of the non-standard paper B, and a LUT prepared by the method disclosed in Japanese Laid-open Patent Application 2006-165752. It will be understood that the LUT exhibits a smooth tone gradation. FIG. 35 shows a reproducibility of the density using the LUT. In the shadow portion, the density is different from the target density, but the tone gradient is slightly improved.

However, with such technique, the tone gradation change of the shadow portion is so intense that an inflection point appears at (a) in FIG. 35, and therefore, smooth tone gradation property is not provided. Because of this, some professional users are not satisfied.

As another technique relating to the automatic tone gradation correction, Japanese Laid-open Patent Application 2004-289200 and Japanese Laid-open Patent Application 2006-222804 discloses that a patch image is printed on the non-standard paper using tone gradation correction data prepared on the basis of the standard paper, and the result of reading the image is used for a correction target. The automatic tone gradation correcting method is proposed as being free of the difference in the density or surface property of the paper per se.

In many cases, the density in the foregoing automatic tone gradation corrections is not an absolute density but is a paper based density (Null Density, relative density). In the following, the paper based density is called relative density. Relative density=absolute density of image−absolute density.

The density management method in the relative density is stipulated in ISO13656 or the like, and is an ordinary reference in the printing field Using the relative density, it is unnecessary to change the target density even when the printing is carried out on various kinds of paper, and therefore, the relative density has been used for management of the printing machines in printing companies Also in the automatic tone gradation correction for an image forming apparatus, the automatic tone gradation correction has been carried out on the basis of the paper based density in view of variations of the reading apparatus and change with time thereof, differences of the paper density due to the differences of the paper lot difference, or the like However, in the case of using the automatic tone gradation correction disclosed in Japanese Laid-open Patent Application 2004-289200 and Japanese Laid-open Patent Application 2006-222804, the user has to prepare standard paper beforehand. In addition, the user has to be aware of the type of the non-standard paper and has to always carry out the tone gradation correction for the non-standard paper this means that what results is mere replacement of the standard paper with the non-standard paper. There is a liability that the non-standard paper registered on the basis of the standard paper may become out of stock. In such a case, the problem arises, because the user encounters the difference in the surface property, the whiteness degree, thickness, and/or grain of the paper due to lot difference, in addition, the difference in the whiteness degree, the paper per se due to the atmospheric corrosion resistance.

When a plurality of kinds of paper are registered against the inventory depletion of the non-standard paper, the user has to make choice the kind of paper to use for the automatic tone gradation correction. With increase of the number of the prepared kinds, the operation becomes more difficult, and the probability of mistake increases. In addition, the memory capacity for the registration has to be large correspondingly with the result of the increase in cost Furthermore, the user is required to carry out twice the reading operations each including producing tone gradation correction data on the basis of reading of the printed patch on the standard paper, printing a patch on non-standard paper using the produced tone gradation correction data, reading the patch by the image reading station, and making correction. Therefore, the usability is not sufficient.

Moreover, the coloring material of electrophotographic image is low in the transmission factor, and therefore, a solid image density is substantially immune to paper density. The conventional automatic tone gradation correction utilizing the density detection method in the printing field as it is, when the same amounts of the coloring material are on different sheets of paper, the relative densities are different. For this reason, when the automatic tone gradation correction is effected with different paper density, the result of the density after correction is different, and therefore, the automatic tone gradation correction with the standard paper is required.

DISCLOSURE OF THE INVENTION

Accordingly, it is a principal object of the present invention to provide an image forming apparatus in which image defects are suppressed to accomplish satisfactory image qualities by effecting engine tone gradation correction with high usability and with low memory cost without using standard paper.

According to an aspect of the present invention, there is provided an image forming apparatus comprising an image reading station for reading a pattern image formed on a recording material by said image forming station; and a tone gradation corrector for calculating a halftone dot area property on the basis of a density of the pattern image read by said image reading station and executing tone gradation correction of said image forming station on the basis of the halftone dot area property.

According to another aspect of the present invention, there is provided an image forming apparatus comprising an image forming station for forming a pattern image on a recording material; an image reading station for reading a pattern image formed on a recording material by said image forming station; and a tone gradation corrector for executing tone gradation correction in said image forming station on the basis of a pattern image read by said image reading station, wherein said tone gradation corrector effects tone gradation correction processing to a density property when a tone gradation correction for a copy image is effected, and said tone gradation corrector effects tone gradation correction processing to a halftone dot area property when the tone gradation correction for a printer image is effected.

EMBODIMENT 1

FIG. 1 is a schematic illustration of an image forming system including an image forming apparatus. In FIG. 1, the image forming system includes a host computer 1001 and an image forming apparatus 1030. The host computer 1001 and the image forming apparatus 1030 are connected with each other. FIG. 2 is a substantial illustration of an image forming apparatus 1030 according to an embodiment of the present invention.

Description of Image Forming Apparatus:

Referring to FIG. 1, a printer controller 1031 controls the entire operation of the printer in the image forming apparatus 1030 of this embodiment. The host I/F portion 1048 in the printer controller 1031 controls the input/output relative to the host computer 1001.

An input/output buffer 1032 sends data to and receives data from a control code and each of communicating means, the CPU1033 controls the operations of the printer controller 1031.

The program ROM 1034 is capable of including a control program to be executed by the CPU1033 and/or control data. The program ROM 1034 includes as program modules an image information generation portion 1041, a patch generation portion 1044, an engine tone gradation correction table preparing portion 1045 and an engine tone gradation correction executing portion 1042. These program modules are usable to control conversion to brightness information and/or density information halftone dot area percentage, and generation of a patch image, in the execution of the tone gradation correction which will be described below, in cooperation with the CPU1033

An image information generation portion 1041 is capable of generating various image objects on the basis of data setting received from the host computer 1001. The patch generation portion 1044 is capable of generating a patch image used when measuring the halftone dot area percentage during the execution of the engine tone gradation correction. The engine tone gradation correction table preparing portion 1045 is capable of producing the engine tone gradation correction table on the basis of the measurement result of the halftone dot area percentage. In addition, engine tone gradation correction executing portion 1042 is capable of effecting the engine tone gradation correction on the basis of the result of the measurement of the halftone dot area percentage of the patch image.

A RAM 1035 is capable of using for interpretation of the data, calculation necessary for printing or capable of using as work memory for processing the print data. In the RAM 1035, an engine tone gradation correction table storing portion 1050 for storing correction table can be stored.

A bit map image expanding and transferring portion 1040 in the printer controller 1031 expands the image object into the bit map image and is capable of transferring the expanded bit map image to the engine portion 1036 of the printing apparatus.

The engine portion 1036 of the printing apparatus includes an engine controller 1049 and is capable of actually effecting printing of the bit map image expanded by the bit map image expanding and transferring portion 1040, on a sheet of paper. The engine controller 1049 is capable of controlling printing process (sheet feeding process, for example) by the mechanisms.

The engine portion 1036 of the printing apparatus and the printer controller 1031 are connected through the engine I/F portion 1046.

The operation of the printing apparatus can be controlled through operation panel 1037, and the printer controller 1031 and the operation panel 1037 are connected with each other.

In addition, external memory portion 1038 can be used to store print data and various information or the like of the printing apparatus. The printer controller 1031 and external memory portion 1038 are connected by the memory I/F portion 1039. Each unit in the printer controller 1031 is connected to the system bus 1043.

FIG. 2 is a schematic illustration of the four full color laser beam printer of an electrophotographic type which is an image forming apparatus according to an embodiment of the present invention.

The laser beam printer (image forming apparatus of this embodiment comprises four image forming stations for forming magenta, cyan, yellow and black images. Each of the image forming stations comprises an electrophotographic photosensitive member (photosensitive drum) 1a, 1b, 1c, 1d in the form of a drum which is an image however having member supported rotatably in the clockwise direction in the Figure. The photosensitive drum 1a, 1b, 1c, 1d is rotated counterclockwisely in the Figure at a predetermined process speed (peripheral speed). Around the photosensitive drum 1a, 1b, 1c, 1d, there are provided a primary charger (charging means) 2a, 2b, 2c, 2d, a developing device (developing means) 4a, 4b, 4c, 4d arranged substantially in this order along the rotational direction. In addition, around the photosensitive drum 1a, 1b, 1c, 1d, there are provided a transfer charger (transferring means) 5a, 5b, 5c, 5d and a cleaning device (cleaning means) 6a, 6b, 6c, 6d and so on.

Above the photosensitive drum 1a, 1b, 1c, 1d, there is provided an exposure device (exposure means) 3a, 3b, 3c, 3d for image exposure of the photosensitive drum 1a, 1b, 1c, 1d.

In each of the image forming stations, the photosensitive drum 1a, 1b, 1c, 1d is uniformly charged by the primary charger 2a, 2b, 2c, 2d, and is exposed by the exposure device 3a, 3b, 3c, 3d, so that an electrostatic latent image is formed on the photosensitive drum 1a, 1b, 1c, 1d. The electrostatic latent image is visualized by the developing device 4a, 4b, 4c, 4d into a toner image.

In the following, when the members or devices are referred to as a whole or when it is not necessary to specify the colors, they will be referred to simply as photosensitive drum 1, primary charger 2, exposure device 3, developing device 4, transfer charger 5 and cleaning device 6, for example.

As shown in FIG. 2, a toner amount sensor (toner amount detecting means) 30 (30a, 30b, 30c, 30d) is provided to oppose to the photosensitive drum 1 (1a, 1b, 1c, 1d) in each of the image forming stations. The toner amount sensor 30 is to detect the toner amount of a toner image formed on the photosensitive drum 1, and is used to determine a maximum toner amount condition (grid bias of the primary charger, developing bias voltage, laser power).

Below between the developing device 4a, 4b, 4c, 4d and the cleaning device 6a, 6b, 6c, 6d of the photosensitive drum 1a, 1b, 1c, 1d, there is provided a transfer belt 17 which is a recording material feeding means in contact with the photosensitive drum 1a, 1b, 1c, 1d. The transfer belt 17 rotates in the direction of an arrow R17, carrying a recording material P such as paper, transparent film or the like to feed the recording material P to the photosensitive drum 1a, 1b, 1c, 1d sequentially. The toner images formed on the photosensitive drums 1a, 1b, 1c, 1d in the image forming stations are sequentially transferred onto the recording material P on the transfer belt 17 by the transfer chargers 5a, 5b, 5c, 5d.

The recording material P is ordinarily paper, and therefore, the recording material P may be called simply paper in the following description and claims, but it is not limited to paper.

The image forming apparatus further comprises a plurality of sheet feeder, more particularly sheet feeding cassettes 12, 13, 14, a manual insertion sheet feeding tray 11 which is drawable in the direction of an arrow R11 in FIG. 2, and a large capacity paper deck 15. The recording material P is supplied to the feeding belt 17 through one of a sheet feeding roller, a feeding roller, a registration roller 16 of the sheet feeders.

Onto the recording material P, the color images formed on the photosensitive drums 1a, 1b are sequentially transferred, while passing through the image forming stations on the transfer belt 17. After the transfer step, the recording material P is separated from the transfer belt 17 by a separation charger 18 and is fed to the fixing device 20 by feeding belt 19 which is a recording material guiding means.

The fixing device 20 comprises a fixing roller 21 supported rotatably, a pressing roller 22 which rotates in press-contact with the fixing roller 21, a parting material applicator 23 which is a parting material apply means, and a roller cleaning device. Inside the fixing roller 21 and pressing roller 22, there are provided heaters (unshown) such as halogen lamps, respectively. To the fixing roller 21 and the pressing roller 22, thermisters (unshown) are contacted, respectively, and the voltages applied to the respective heaters through the temperature control apparatus 26 are controlled to effect surface temperature control for the fixing roller 21 and pressing roller 22. The pressing value of the pressing roller 22 and the surface temperatures of the fixing roller 21 are variable by a fixing controlling mechanism 25.

A driving motor (unshown) for driving the fixing roller 21 and the pressing roller 22 is connected with a speed control device 27 for controlling rotational speeds of the fixing roller 21 and the pressing roller 22 thereby controlling the feeding speed of the recording material P. By this, the unfixed toner image on the surface of the recording material P is fused and fixed so that a full-color image is formed on the recording material P. The recording material P on which the full-color image is fixed is separated from the pressing roller 22 by a separation claw (unshown) and is discharged onto a sheet discharge tray 24.

In the upper portion of the image forming apparatus shown in FIG. 2, there are provided an original reading station (image reading station) 28 and an operation display screen 29. The original reading station 28 optically scans the original supported on an original carriage (unshown) to read it and provides image signal of each color. In addition, the operation display screen 29 is used for inputting commands by the operator (user, service person) and for notifying the state of the apparatus to the operator. Using the reading apparatus, the automatic tone gradation correcting pattern outputted from the image forming apparatus is detected, and the LUT for the engine tone gradation corrector is changed, as will be described hereinafter.

Toner Amount Detecting Means:

FIG. 3 illustrates an example of a toner amount detection sensor which is a toner amount detecting means. The toner amount detection sensor 30 comprises a light receiving portion 401 including a light emitting portion 400 having a LED (light emitting diode), and PDs (photo-detectors). The light receiving portion 401 includes two PDs and detects diffused reflection light.

The light lo projected to the photosensitive drum 1 from the light emitting portion 400 is reflected by the surface of the photosensitive drum 1. The reflected light lr is received by the light receiving portion 401, and outputs receipt light quantity information. The photosensitive drum 1 used in this embodiment is a drum having a smooth surface. When the drum is covered with the toner, the surface is non-smooth. That is, the received light quantity increases with increase of the toner amount. Using the change of the sensor voltage output, the toner amount can be detected, and therefore, it can be used for the maximum toner amount control which will be described hereinafter.

The reflected light measured by the light receiving portion 401 is monitored also by a LED light quantity controller 403. The LED light quantity controller 403 sends the light quantity of the reflected light lo to the main control CPU311. Prior to the maximum toner amount control, the main control CPU311 adjusts the light quantity on the basis of the receipt light quantity (measured value) of the reflected light lr so that the lr is a predetermined value.

When the image outputting operation is not carried out, a shutter drive control portion 407 is operated to drive the shutter portion 408 to avoid sensor port contamination by the toner scattering.

Maximum Toner Amount Control:
(Potential Control)

A potential control which is the fundamental of the maximum density condition will be described.

The maximum density condition is to determine charging, latent image and developing conditions.

Prior to the toner amount sensor which will be described hereinafter detects the patch, target charged potential (VdT), grid bias voltage and developing bias voltage (Vdc) are determined by the potential control. By the potential control process, the charged potential or the like can be determined corresponding to the ambient condition (including temperature and/or humidity conditions) in which the image forming apparatus 1030 is placed.

In this embodiment, the engine controller 1049 effects the potential control which is so-called two-point control. FIG. 4 illustrates a concept of the two-point control.

In FIG. 4, Vd1 is a charged potential in a first charging condition (grid bias is 400V), and Vl1 is a light portion potential provided by the laser power of the standard level (middle value in the laser power variable range). In addition, Vd2 is a charged potential in a second charging condition (grid bias is 800V), and Vl2 is a light portion potential provided by the standard laser power at this time. a In this case, the contrast potentials (Cont1, Cont2) with the grid bias voltages of 400V and 800V can be calculated by following (1) and (2).

$$(Cont1)=(Vd1-Vl1) \quad (1)$$

$$(Cont2)=(Vd2-Vl2) \quad (2)$$

The increase amount of the contrast potential (ContΔ) per charged potential 1V can be calculated by the following (3) on the basis of results of (1) and (2).

$$(Cont\Delta)=((Cont2-Cont1)/(Vd2-Vd1)) \quad (3).$$

On the other hand, the image forming apparatus 1030 is provided with an unshown ambient condition sensor, which measures the ambient conditions such as temperature and humidity in the image forming apparatus 1030. The engine controller 1049 determines the ambient condition (absolute water content, for example) on the basis of the result of measurement of the ambient condition sensor. Then, the target contrast potential (ContT) corresponding to the ambient condition is obtained from the ambient condition table provided beforehand.

The relation between the target contrast potential (ContT) and the increase amount (ContΔ) of the contrast potential can be calculated by the following (4):

$$ContT=Cont1+X*Cont\Delta \quad (4)$$

The parameter X satisfying the relation of equation (4), and then the target charged potential (VdT) (target potential) can be calculated by the following equation (5).

$$VdT=Vd1+X \quad (5).$$

The change amount (VdΔ) of the charged potential per iV of grid bias voltage can be calculated by the following (6)

$$(Vd\Delta)=(Vd2-Vd1)/(800-400) \quad (6).$$

The grid bias voltage (Y) for the target potential (VdT) can be calculated from the following equation (7):

$$Target\ VdT=400+Y*Vd\Delta \quad (7)$$

In equation (7), Vd can be calculated by equation (6), and VdT can be calculated from equation (5) By substituting a potential obtained by equations (5) and (6), the grid bias voltage (Y) satisfying equation (7) can be determined finally.

By the foregoing process, the target potential (VdT), the grid bias voltage (Y) corresponding to the ambient condition can be determined. The developing bias voltage (Vdc) has a predetermined potential, and can be calculated by deducting the predetermined potential from the target potential (VdT).

The subsequent image forming operations are carried out with the determined developing bias voltage. The potential of the surface of the drum is negative, but the negative sign is omitted for easy understanding of the calculation process.

Thus, the grid bias voltage and the developing bias voltage (Vdc) to be used during image formation are determined.

(Maximum Toner Amount Control Using Toner Amount Sensor)

The maximum toner amount control using the toner amount sensor (toner amount detecting means) will be described.

The condition determined by the potential control matches the target contrast potential corresponding to the ambient condition obtained from the ambient condition table registered beforehand. This is the target contrast obtained with a standard machine, and therefore, the maximum density is not the predetermined level in many cases due to the difference in the machines or after long term use. In view of this, in this embodiment, there is provided a toner amount sensor 30 to detect the toner amount on the photosensitive member. For the purpose of adjusting the maximum density condition in this embodiment, the laser power (LPW) is changed.

A pattern shown in (a) of FIG. 5 wherein the maximum toner amount is varied is formed on the photosensitive member. For example, the patches are formed with light quantities of the standard value, 20% Down level, 10% Down level, 10% Up level, 20% Up level. The patch potentials in this case are as shown in (b) of FIG. 5, wherein vl1 matches LPW1 (20% UP), and there are Vl2-Vl5 patches.

The size of the patches is 40 mm×40 mm square in view of a detection range of the potential sensor. The patch is formed with PWM (pulse width modulation: light emission time), and for the area between the patches, PWM is zero, and for the patch portions, PWM is adjusted for predetermined light quantities. In this embodiment, the light is emitted with longest duration per unit pixel (single pixel in 600 dpi).

The patch potential is measured for each LPW, and the toner amount is detected by the toner amount sensor 30. FIG. 6 shows Vcont (Vdc−Vl) of each patch and a patch detected value of the toner amount sensor. In this embodiment, the target is 0.55 mg/cm$^2$, and from the detection result of FIG. 6, the relation of the toner deposition amount is obtained, and then they are plotted with linear interpolation. Then, the Vcont corresponding to 0.55 mg/cm$^2$ is obtained. In the case of the engine in the state shown in FIG. 6, the proper Vcont is 230V, and by increasing the LPW by 9% (+9% Up), the toner deposition amount can be made to 0.55 mg/cm$^2$.

The calculating method for the maximum toner amount control is summarized as follows:

preliminary preparation: Vd is set to Vdc by the potential control:

(1) to form a latent image of a patch with the predetermined LPW (5 point) (charging, laser):
(2) to detect the patch potential by the potential sensor:
(3) to develop the patch latent image:
(4) to detect the patch density by the toner amount sensor:
(5) to obtain LPW, patch potential (Vl), toner amount (To):
(LPW, Vl, To)=
(102 level, 150V, 0.42 mg/cm$^2$)
(115 level, 130V, 0.45 mg/cm$^2$)
(128 level, 100V, 0.49 mg/cm$^2$)
(141 level, 80V, 0.56 mg/cm$^2$)
(154 level, 55V, 0.59 mg/cm$^2$):
(6) to convert Vl to Vcont (Vdc−Vl)
(LPW, Vcont, To)=
(102 level, 165V, 0.42 mg/cm$^2$)
(115 level, 185V, 0.45 mg/cm$^2$)
(128 level, 215V, 0.49 mg/cm$^2$)
(141 level, 235V, 0.56 mg/cm$^2$)
(154 level, 260V, 0.59 mg/cm$^2$)
(7) to calculate the difference (To−0.55) from the target toner deposition amount.
(LPW, Vcont, ΔTo)=
(102 level, 165V, −0.13 mg/cm$^2$)
(115 level, 185V, −0.10 mg/cm$^2$)
(128 level, 215V, −0.06 mg/cm$^2$)
(141 level, 235V, 0.1 mg/cm$^2$)
(154 level, 260V, 0.4 mg/cm$^2$):
(8) to extract the condition for minimum positive difference, and the condition for minimum negative difference:
Positive side (LPW (+), Vcont (+), ΔTo (+))=
(141 level, 235V, 0.01 mg/cm$^2$)
Negative side (LPW (−), Vcont (−)ΔTo (−))=
(128 level, 215V, −0.06 mg/cm$^2$)
(9) to calculate LPW (LPW (T)) at which To is 0.00

$$LPW(+)-((\Delta To(+)-0)/(\Delta To(+)-\Delta To(-))/(LPW(+)-LPW(-))))=139.14286$$

By rounding,
=139
(10) to register the potential control target:

$$V\text{cont}(+)-((V\text{cont}(+)-V\text{cont}(-))/(LPW(+)-LPW(-))*((LPW(+)-LPW(T))=231.9231$$

By rounding,
=232

The registration of the potential control target in (10) is the change of the potential control target determined by the ambient condition table. The maximum toner amount control using the toner amount sensor requires printing of the patch, and from the standpoint of the toner consumption amount, it is not possible to increase the frequency of such printings. The potential control does not require development of the toner for the detection of the patch potential, and therefore, a short time variation can be compensated for by the potential control. Frequency will be described.

High frequency: potential control.

Intermediate frequency: maximum toner amount control.

Low frequency (user starting): automatic tone gradation correction which will be described hereinafter.

<Automatic Tone Gradation Correction>

In a conventional automatic tone gradation correction, a tone gradation patch image printed on paper is read by a reader portion (image reading station) 28 to detect a brightness value, and the read is converted to density information using a brightness density conversion table prepared beforehand, and then, a LUT is adjusted so as to provide a predetermined density curve. As described hereinbefore, even if the same amounts of the toner are deposited, the densities are different depending on the kinds of paper. When the control is effected so as to match the predetermined density curve, the inconveniences occurs in the tone gradient of the shadow portion (Background Art).

This phenomenon is caused by following reasons generally:

(a) the color of paper (spectral characteristics) is different.

(b) the degree of melting is different depending on the paper thickness.

(c) the paper surface of property (unsmoothness knurled pits and projections) is difference.

The density is obtained by calculating a percentage of the light (li) at 0 degree when the light (lo) is incident at 45 degrees, and the density increases with decrease of the diffused reflection component.

$$\text{Density}=-\log(li/lo).$$

As regards (a), as shown in FIG. 7, even if the same amount of the same toner is deposited with the same pattern, the reflectance is affected by the paper whiteness (spectral reflectance (FIG. 7C)). In the case of FIG. 7, the non-standard paper exhibits a high density. Therefore, the density detected by the reader portion 28 is influenced.

As regards (b), FIG. 8 schematically explains the phenomenon. An image forming apparatus accepts a predetermined range of basis weight, for example, 64-128 g/m$^2$. Depending on the difference in the thickness, even if the same amount of the same toner deposited on the paper, the heat quantity and the pressure applied to the toner in the fixing device are different. Therefore, with increase of the thickness of paper, the shapes of the toner particles become closer to spherical with the result of increase of the diffused reflection component. In the case of standard paper of FIG. 8, the specular reflection component increases, and the component decreases. Thus, the diffused reflection amount changes, and therefore, the density detected by the reader portion 28 is influenced.

As regards (c), as shown in FIG. 9, the toner is deposited so as to follow the shape of the unsmoothness of the paper. Therefore, when the paper is smooth, the surface of the toner particles is also smooth, and if the smoothness of the paper is poor, the unsmoothness is reflected. Even if the deposited amount of the toner is the same, the density detected by reader portion 28 is different since the amount diffused reflection is different depending on the unsmoothness of the paper surface.

Furthermore, the offset printing and the electrophotographic type printing are significantly different in the transmission density. The transmission density is lower in the offset printing than in the electrophotographic type printing. In other words, the background (paper) appears more.

The inventors have investigated the transmission density of black using imagePressC1 available from Canon-Kabushiki Kaisha, Japanese and an offset printing machine with CLC sheet of 81.4 g/m². The used transmission densitometer is X-Rite361t. The conditions other than the sheet in the offset printing machine are JapanColor reference. More particularly, the adjustments were made to meet the JapanColor with JapanPapar, and solid patches were printed on the CLC sheet.

The following Table shows transmission densities of the ink and toner, which are obtained by deducting the absolute value of the transmission density of the paper from the absolute value of the transmission density of the solid patch.

TABLE 1

| Machines | Offset-printer Conditions Other than paper are JapannColor | imagePressC1 |
|---|---|---|
| Transmission Density | 0.78 | 1.30 |

As will be understood, the transmission density of the toner in the electrophotographic type exhibits high transmission density, that is, the transmission factor is low. This is because of the colorant material, dispersion property of the colorant, thickness of the bonding layer. In the case of the offset printing, the thickness of the bonding material layer is 1 μm-2 μm, whereas in the case of the toner, it is 5 μm-10 μm. The difference is reflected as the difference in the transmission density.

As described, the electrophotographic type printing and the offset printing are different in the influence around the solid image density, but the automatic tone gradation correction has been effected using the relative density. The relative density is obtained by deducting the paper density uniformly over the entire density area, and therefore, the deduction is too much around the high density.

In this embodiment, the density information is converted to a halftone dot area ratio (halftone dot area percentage, or simply halftone dot percentage) so that the engine tone gradation correction can be carried out even when the density detection result is different depending on the kind of paper.

By using the halftone dot percentage, the influence of the paper density can be large in the high light portion, and can be small in the shadow portion.

One predetermined target of the halftone dot percentage is provided, and a LUT is prepared so as to meet the halftone dot percentage thereof. With this structure, that is, by changing the degree of influence of the reflectance of the paper depending on the tone gradation and by correcting to provide the predetermined tone gradation property, smooth tone gradation property can be provided substantially free from non-continuous tone gradation property of the shadow portion without memory cost increase, thus providing a high image quality image forming apparatus.

Referring to a flow chart of FIG. 10, the automatic tone gradation correction of this embodiment will be described.

The automatic tone gradation correction is started by the user or service person pushing a tone gradation correction key on an operation screen shown in FIG. 11.

When the tone gradation correction key is pushed a, the image forming apparatus completes the potential control and the maximum toner amount control.

The patch generation portion of the program ROM 1034 prints, on the paper, 64 tone gradation test pattern including CMYK colors shown in FIG. 12, and the reader portion 28 reads the brightness signal of the patch. The densities of the tone gradation test pattern is such that the upper right end portion has a highest density, the lower left end portion has a lowest density, the density gradually decreases from the right to the left, and decreases from the top to the bottom. Four lines are one set for one color, and four sets are prepared for cyan, magenta, yellow and black colors.

The read signals form a curve as shown in FIG. 13. In the graph of this Figure, the abscissa represents input signals, and ordinate represents the brightness values read by the reader. Brightness value 255 of the reader portion 28 corresponds to density of 1.60. (the density is calculated by Xrite500 series with StatusT, white packing, Visual filter, absolute value base) In the description, the black (K) is taken as a representative.

FIG. 14 are plots of the brightness values of the reader portion 28 vs the regulated density values of patch images formed on the standard paper, wherein the density is regulated on the basis of 255 corresponding to 1.60. Using the brightness density conversion table, the detected brightness value is converted to density value.

FIG. 15 shows a tone gradation property of a printer using the brightness density conversion table of FIG. 14 relative to the input signal wherein the abscissa represents input signal value, and the ordinate represents the density value. In a conventional image forming apparatus, the density information is converted to a relative density by deducting the paper density therefrom, and the LUT is prepared so as to meet the desired relative density target.

Referring to FIG. 16, the density value of FIG. 15 is converted to a halftone dot area percentage using the Murray-Daviess formula which will be described hereinafter, and is plotted relative to the input signal. By such a conversion to the halftone dot area percentage information using the Murray-Daviess formula, the maximum density portion is 100% in the halftone dot area percentage even if the maximum read density changes depending on the kind of paper. Furthermore, the density of the paper is 0%, the color of the background is not influential, and the density difference due to the paper kind difference can be compensated for over the entirety of the tone gradation.

The graph is based on halftone dot area 100% corresponding to 255.

Murray-Daviess formula:

Halftone dot area percentage=$(1-10^{(-Dt)})/(1-10^{(-Ds)})*100$ $Ds$=(maximum density−paper density)

$Dt$=(halftone dot density−paper density)

The halftone dot density is a measurement density of the tone gradation pattern, and the maximum density is the maximum density of the tone gradation pattern.

FIG. 17 shows the printer tone gradation property prepared on the basis of the halftone dot area percentage of FIG. 16, a target curve, and a LUT for providing the target. In this embodiment, the target curve is such a tone gradation curve that when the input signal (input halftone dot area percentage) is 50%, the output signal, that is, the output halftone dot area percentage is 70%, namely, the dot gain property is 20%.

The LUT is stored in an engine tone gradation correction table storing portion 1050, and is used by the engine tone gradation correction executing portion 1042 during normal image formation.

FIG. 18 shows a density tone gradation property using the LUT (halftone dot area percentage target) of FIG. 17, and a density tone gradation property using the LUT prepared from the conventional density target prepared using the same non-standard paper.

With the conventional method, the tone gradation non-continuous property is unavoidable at the portions indicated by (a) and (b) since the adjustment is to meet the density value.

On the other hand, by preparing the LUT so as to meet the predetermined halftone dot area percentage target on the basis of the halftone dot area percentage, the difference in the sheet can be accommodated over the entirety of tone gradation range. That is, the degree of influence of the reflectance of the paper is changed depending on the tone gradation and is corrected to the predetermined tone gradation property, by which the automatic tone gradation correction control immune to the influence of the paper. The predetermined tone gradation property is tone gradations having a dot gain property within the predetermined range. The dot gain property is a difference between the input halftone dot area percentage and the output halftone dot area percentage.

Verification of Embodiment 1

The automatic tone gradation correction using the Murray-Daviess formula of Embodiment 1 will be described. In the verification, it will be confirmed that the object of the present invention is accomplished while changing the tone gradient and the influence degrees of the background depending on the tone gradation.

Paper 1: Canon-office planner 68 m² (plain paper)
Paper 2: color paper 68 g/m² pink (color paper) for Canon-PPC.
Pattern printing kind of device: ImagePress C1
Color: black.
Processing method: the automatic tone gradation correction of Embodiment 1.

FIG. 19 shows a relation between the input signal (input halftone dot area percentage) of the printing under the above-described conditions and the density. The solid line indicates paper 1, and the broken line indicates paper 2. They are under the same conditions, and the thicknesses thereof (basis weight) are the same, and therefore, the density of the solid image is substantially the same. However, the high light portion is influenced by the color of the paper, and in the case of the color paper, the density is approx. 0.2, and in the case of plain paper, the density is approx. 0.07, that is, there is a difference of 0.13.

FIG. 20 shows the halftone dot area percentage converted from the data of FIG. 19 using the Murray-Daviess formula. As a result, there is no difference depending on the paper difference. That is the paper density difference 0.13 has been removed. Above-described in Embodiment 1, only one halftone dot percentage target is used, and the same LUT is produced. FIG. 21 shows the result which is expressed by a dot gain property (dot gain %) which is a difference between the input halftone dot area percentage and the output halftone dot area percentage. The same LUT are successfully usable for the different sheets of paper.

In the conventional example, when the color paper is used at the time of automatic tone gradation correction using the relative density target, the solid image density is deemed as being lower. That is, the density difference 0.13 between the white paper and the color paper is applied to the solid image density. As a result, the density is lower than expected, and the LUT for the non-standard paper B shown in FIG. 29 is produced. Even if a terminal end correction is carried out, the discontinuities at the inflection points are unavoidable.

With the automatic tone gradation correcting method, the natural tone gradient without the discontinuity can be accomplished even when there is an extreme difference, as in the case of color paper.

In another aspect, the influence of the paper does not appear in the solid density portion. On the other hand, in the high light portion, the difference of the kind of the paper is accommodated by the calculating process. In other words, the degree of influence of the density of the paper (influence of reflectance of paper) is modified depending on the tone gradation (halftone dot percentage). The influence degrees of the paper is high in the high light portion, and is low in the shadow portion, by which an automatic tone gradation correcting method immune to the different of the paper is accomplished.

EMBODIMENT 2

In Embodiment 2, the Murray-Daviess formula is modified to provide a more versatile automatic tone gradation correcting method. The process which is the same as with Embodiment 1 will be omitted.

Paper 1: Canon-office planner 68 m² (plain paper)
Paper 2: color paper (thick type) 125 g/m² blue (color paper) using Canon-PPC.
Pattern printing kind of device: ImagePress C1
Color: black.
Processing method: the automatic tone gradation correction of Embodiment 1.

The paper 1 is similar to the paper used in the verification in Embodiment 1, and the paper 2 is different in color and thickness (basis weight). Since the phenomenon-shown in FIG. 8 with respect to Embodiment 1 occurs, the solid image density in the case of paper 2 is low (FIG. 22). The density difference of paper is approx. 0.1.

Under these conditions, the automatic tone gradation correction of Embodiment 1 is carried out, and density of the output patch image is analyzed, the result of which is shown in FIG. 23.

At a glance, the matching is all right, but the deviation of halftone dot percentage occurs in the half-tone range. In consideration of the result, the LUT is prepared so as to meet the halftone dot percentage target, and the dot gain property is investigated, and then the result of the investigation is shown in FIG. 24 wherein the accuracy is poorer than in the case of the color paper used in the verification in Embodiment 1.

As compared with the conventional example, the tone gradient is improved, but the result of the engine tone gradation correction is different depending on the kind of paper. For this reason, the automatic tone gradation correction is carried out with different sheets of paper (paper 1 and paper 2), when printing is effected on another paper, a density difference occurs in the half-tone range. The facts show that when the density of the paper and the solid image density are both different from white, the accuracy of the Murray-Daviess formula is limited.

The Murray-Daviess formula is as follows in which Ds and Dt are the same as with the conventional relative densities. Therefore, the density difference in the shadow portion could not be compensated for.

Murray-Daviess formula:

Halftone dot area percentage=$(1-10^{(-Dt)})/(1-10^{(-Ds)})*100$ $Ds$=(maximum density–paper density)

$Dt$=(halftone dot density–paper density)

In this embodiment, the calculation is effected in two stages to accommodate a density difference in the shadow portion.

First Processing:

First halftone dot area percentage=$(1-10^{(-Dt1)})/(1-10^{(-Ds1)})*100$ $Ds1$=(maximum density–paper density)

$Dt1$=(halftone dot density–paper density).

Second Processing.

Halftone dot area percentage=$(1-10^{(-Dt)})/(1-10^{(-Ds)})*100$ $Ds2$=(maximum density–paper density*(100–first halftone dot area percentage))

$Dt2$=(halftone dot density–paper density*(100–first halftone dot area percentage))

The first calculation is the same as with Embodiment 1 using the Murray-Daviess formula to obtain a first halftone dot area percentage which is modified by weighting relative to the paper density by a second calculation.

FIG. 25 shows a result of the second calculation. It has been confirmed that the curves are the same in the halftone dot area percentage. If the halftone dot area percentage target is prepared by the two steps, the same tone gradation correction table can be prepared irrespective of the density of the paper and difference in the solid image density, and the dot gain curves exhibit the same property.

In this manner, the influence degrees of the paper density are made different between the high light portion and the shadow portion, and the halftone dot area percentage is calculated, by which highly versatile automatic tone gradation correction is accomplished.

EMBODIMENT 3

In Embodiment 1, an accurate automatic tone gradation correcting method is provided in the case that the basis weight is the same and a density difference exists. In Embodiment 2, the automatic tone gradation correcting method is versatile even when the solid image density is also different due to difference of the basis weight, in addition to Embodiment 1.

From the standpoint of calculation process or memory capacity, as compared with, the conventional calculation of the density, Embodiment 2 includes the first halftone dot percentage calculation and the second calculation (one conversion calculation in Embodiment 1), and therefore, Embodiment 2 results in increase in the processing time and memory amount for temporary storage.

In Embodiment 3, the content of the calculation is changed to avoid increase of the process time and/or the amount of the memory.

TABLE 2

|  | P. density <0.1 Basis Wt <90 g/m² | P. density <0.1 Basis Wt ≥90 g/m² | P. density ≥0.1 Basis Wt <90 g/m² | P. density ≥0.1 Basis Wt ≥90 g/m² |
|---|---|---|---|---|
| Conventional Density calculation | ○ *1 | | | |
| Embodiment 1 1ˢᵗ calculation | | ○ *2 | ○ *3 | |
| Embodiment 2 2ⁿᵈ calculation | | | | ○ *4 |

In *1, the condition is substantially for the reference paper, and therefore, the inconvenience due to the difference of the paper does not arise, and the calculation is performed with the same density as with the prior art. As regards *2, since the amount of the generation of the density difference depending on the difference in the basis weight is smaller than that depending on the difference of the media density although not described in Embodiment 1 or 2, the first calculation of Embodiment 1 is considered as being enough. The calculation of *3 is the same as that of Embodiment 1. The calculation of *4 is the same as that of Embodiment 2.

For actual switching, the shaded portion of FIG. 26 is added to the program of the engine tone gradation correction table preparing portion of FIG. 1.

The CPU1033 which has executed the maximum toner amount control obtains the property of the paper to print the 64 patch images for the automatic tone gradation correction on the paper, and stores it in the RAM 1050 temporarily. Similarly Embodiment 1, the reading of the 64 patch images by the reader portion and the brightness to density conversion are carried out.

Among 64 pieces of patch information which are converted density information, the density of the paper white portion i.e. 0 signal value is extracted, and the discrimination is made as to whether or not it is less than 0.1. If it is less than 0.1, the basis weight is checked, and if it is less than 90 g/m², the LUT is prepared in this state. If it is not less than 90 g/m², the conversion is made to the first halftone dot percentage by the calculation of the Embodiment 1, and the LUT is prepared.

Since the paper density is not less than 0.1, the influence of the paper density is great, and therefore, the halftone dot percentage calculation (the first calculation of Embodiment 1 and Embodiment 2) is carried out If the basis weight is less than 90 g/m², LUT is generated, and if it is not less than 90 g/m², the second calculation of Embodiment 2 is executed, and then the LUT is generated.

In the process flow described above, the calculation method for the LUT can be automatically selected depending on the necessity (the basis weight of the paper and the density of the paper)

In this embodiment, the calculation method is switched depending on the result of the automatic detection of the paper density and the paper basis weight, but the switching may be made in response to user instructions.

EMBODIMENT 4

The halftone dot percentage calculation is executed in order to suppress the density discontinuity and to provide good tone gradient reproducibility. When the original is on the screen and is printed our, the present invention is particularly effective. On the screen, the additive color mixture by RGB is used, and on the print, the subtractive color mixture requiring reference light occurs (body color) Although the mechanism of coloring is different, general users hardly desire strict identity between the density on the screen and the density on the print.

However, in the case of copying, the original documents are print paper or printer outputs, that is, the colors are all body colors The output prints are easily compared to the original in the density reproducibility, and the faithful reproduction is desired in not a few cases.

In this embodiment, therefore, the LUT generation method for copying is so as to adjust the tone gradation to the conventional density target, and the LUT generation for the printer is so as to adjust the tone gradation to the halftone dot area percentage target.

FIG. 27 shows this feature on the basis of Embodiment 4. Using the patch signal after the density conversion, a conventional LUT for the copying is generated depending on the density state. Simultaneously, the calculation method is selected depending on the density of paper and/or the basis weight thereof, and a predetermined halftone dot percentage calculation (first calculation only or first plus second calculations), and the result is stored in the table storing portion as the LUT for the printer.

In actual operation, the CPU1033 sends information indicative of whether it is the printer or copying selected to the engine tone gradation correction executing portion 1042, and the image is formed using the LUT stored in the engine tone gradation correction table storing portion.

In the printer image formation of the present invention, an image object is generated by the image information generation portion 1041 on the basis of a print information inputted from the host computer 1001 of FIG. 1, is converted to bit map data by the bit map image expanding and transferring portion 1040, is subjected to the tone gradation correction by the engine tone gradation correction executing portion 1042 in the program ROM 1034, and then is sent to the engine portion 1036.

On the other hand, in the copy image formation, the original is read by the original reading station 28 of FIG. 2, is sent to the printer controller, and is subjected to the engine tone gradation correction executing portion 1042 for the tone gradation correction for copying, and then is sent to the engine portion 1036 and is outputted.

In this embodiment, the pseudo-half-tone process pattern is common to the printer and the copying, and therefore, two LUTs are prepared, but if the pseudo-half-tone process patterns for the printer and the copying are different from each other, it is not necessary to prepare two LUTs for one pseudo-half-tone process pattern.

EMBODIMENT 5

In order to improve the usability, the selection may be prompted to the user as shown in FIG. 28 and FIG. 29. In such a case, the LUT is generated using the conventional density in the case of the density preference, and Embodiment 1 or Embodiment 2 is used in the case of the tone gradation preference.

As described in the foregoing, an image forming apparatus in which the tone gradation discontinuous property of the shadow portion arising in the automatic tone gradation correction for the non-standard paper is avoided, and the engine tone gradation correction is possible for the non-standard paper, is provided.

In each of the embodiments, the color image forming apparatus has been a direct transfer type apparatus, but the present invention is not limited to such an apparatus.

For example, the present invention is applicable to a color image forming apparatus of an intermediary transfer type. In such an image forming apparatus, the toner images are once transferred from the image bearing members of the image forming stations onto an intermediary transfer member such as an intermediary transfer belt, and thereafter, a toner images are transferred all together on the recording material (paper) to provide a color image.

As for the color image forming apparatus of the intermediary transfer type, the apparatus is not limited to a color image forming apparatus, either, but it may be a monochromatic image forming apparatus in which the automatic tone gradation correction control of said Embodiment 1, 2 is implemented, by which high quality images can be provided.

INDUSTRIAL APPLICABILITY

Figure 1:
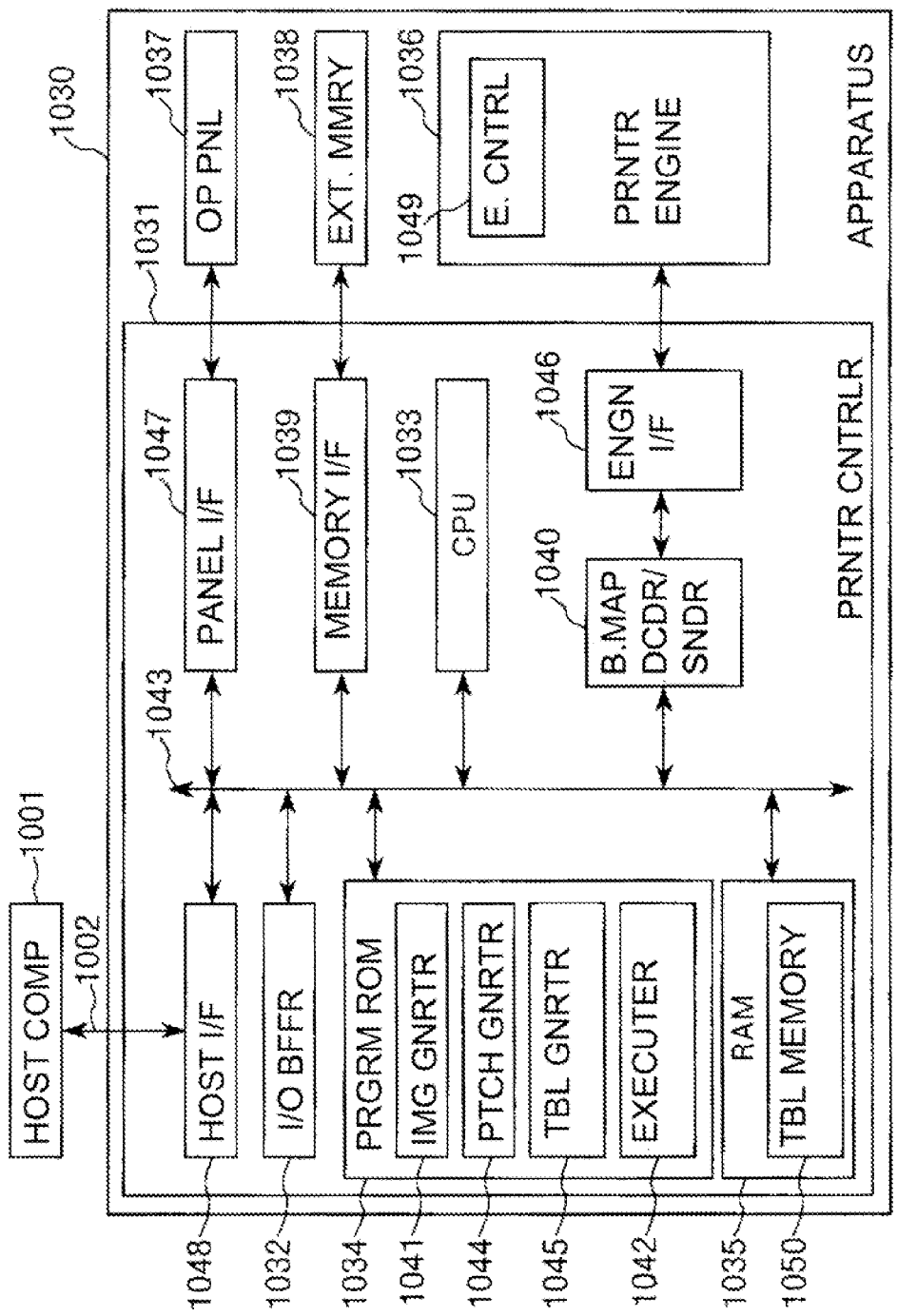
FIG. 1 is a schematic view illustrating structures of an image forming system having an image forming apparatus according to an embodiment.
Figure 2:
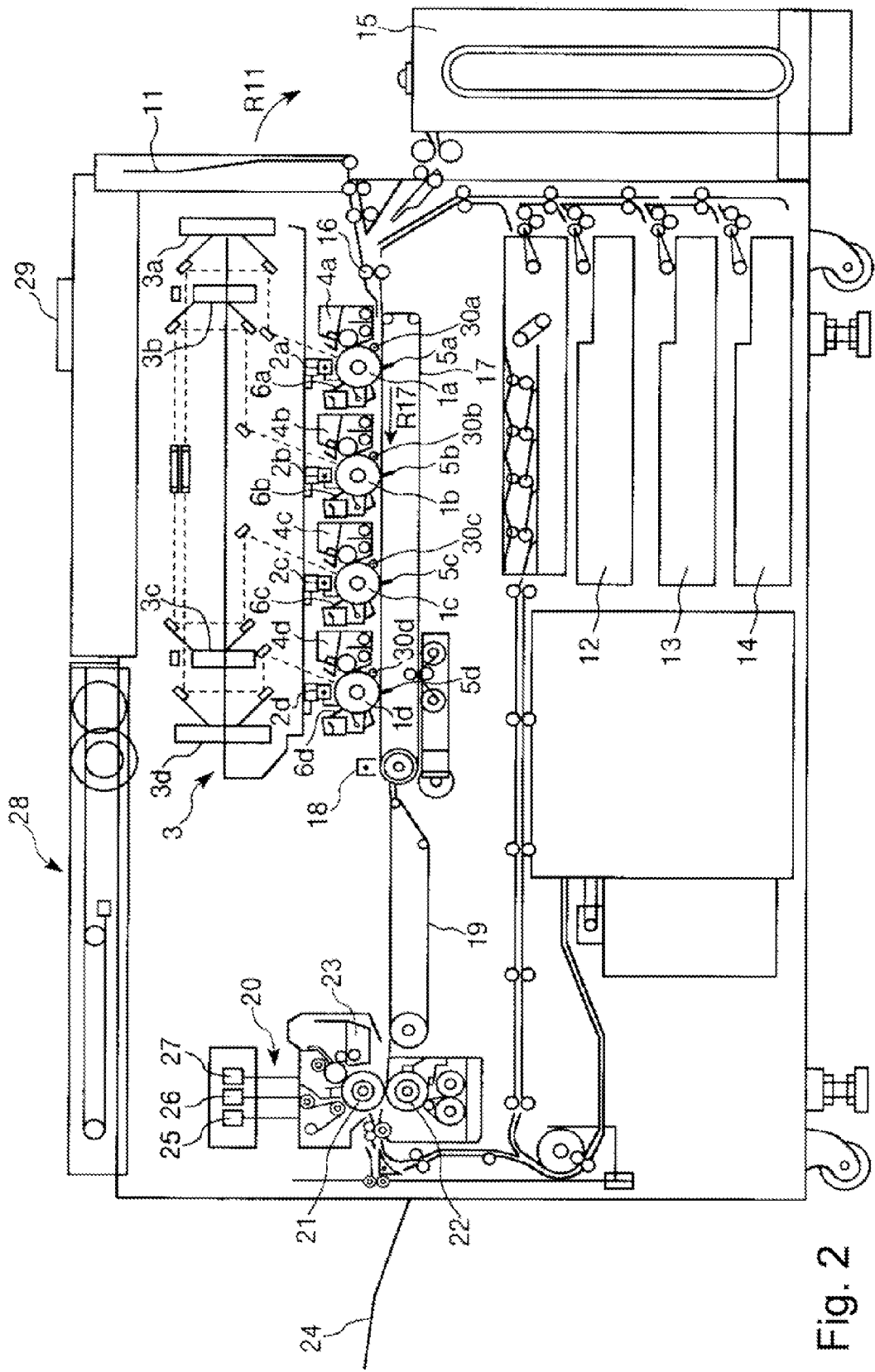
FIG. 2 is a schematic illustration of the image forming apparatus according to the embodiment.
Figure 3:
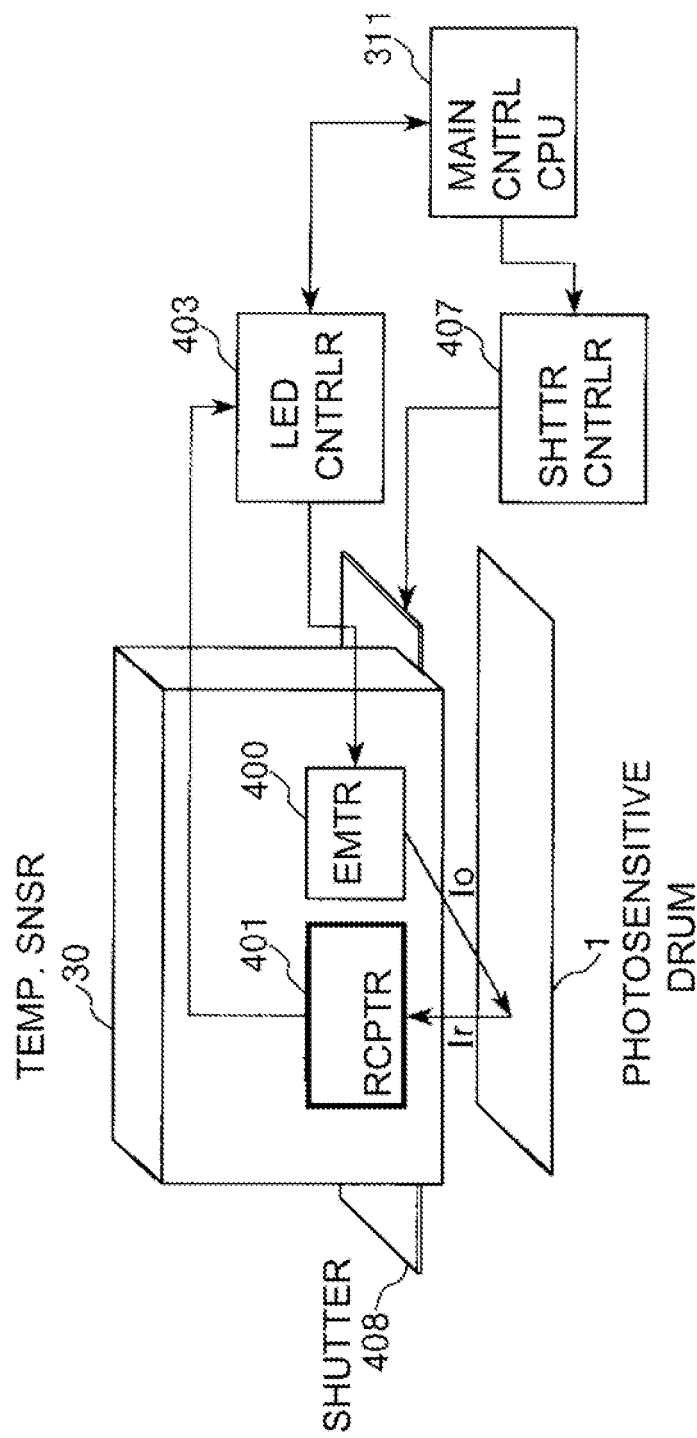
FIG. 3 illustrates an example of a toner amount detection sensor.
Figure 4:
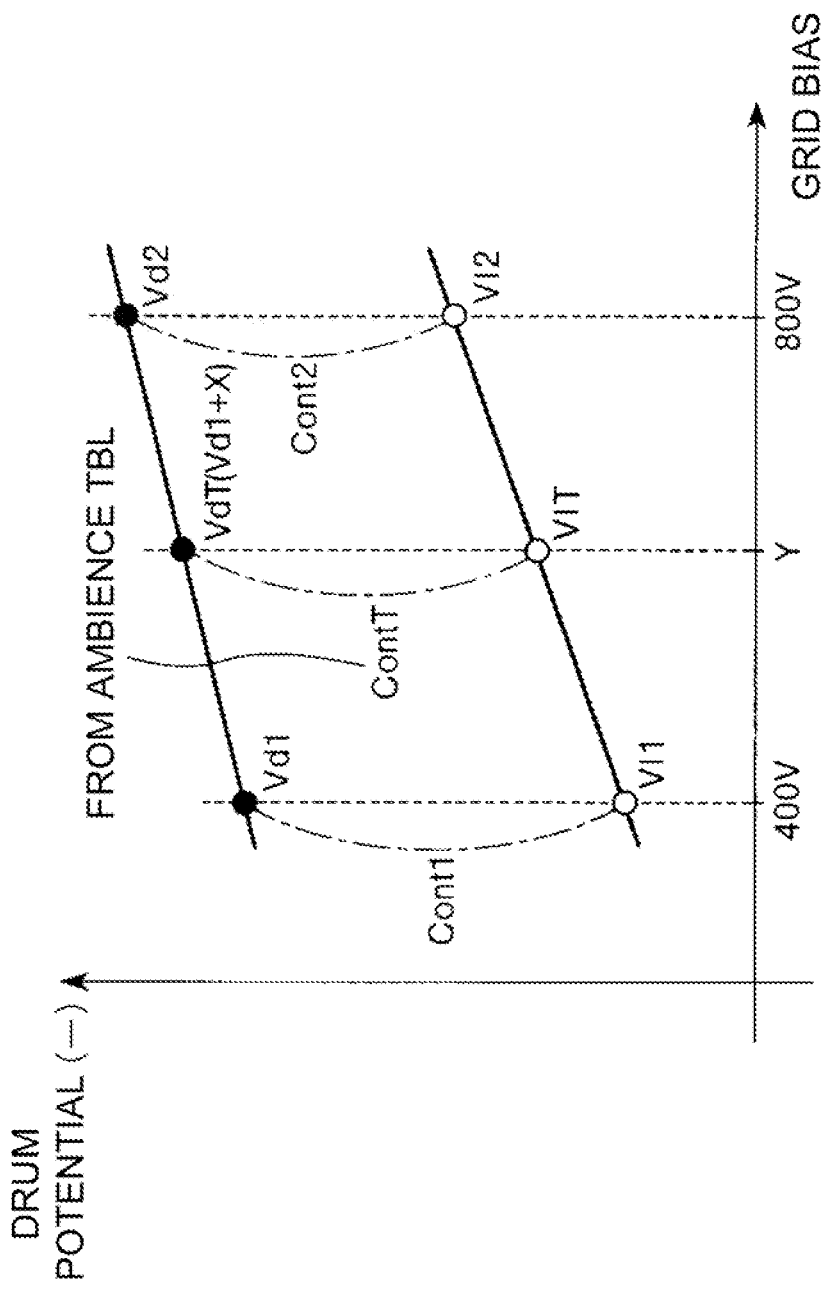
FIG. 4 illustrates a concept a potential control.
Figure 5:
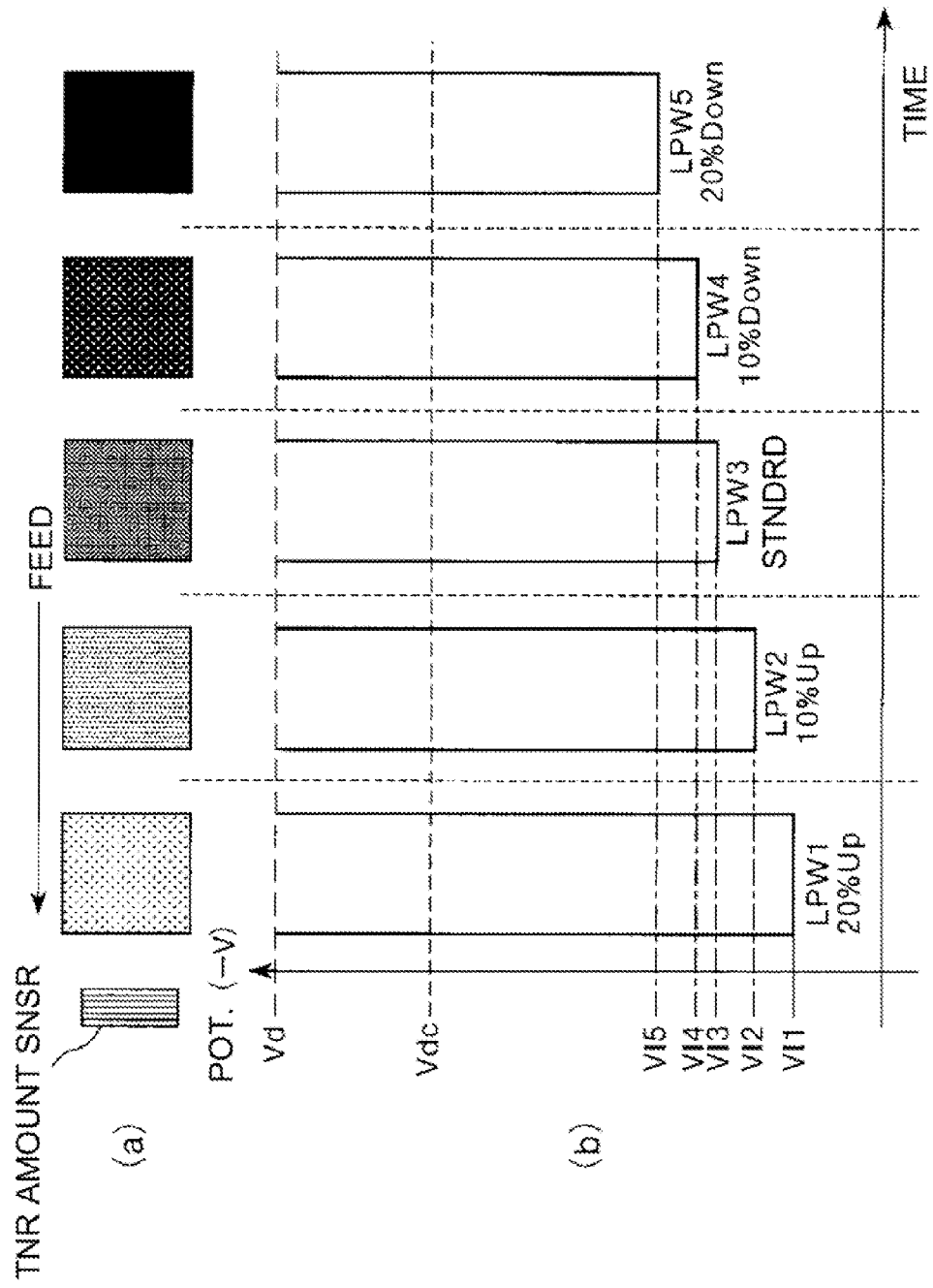
FIG. 5 illustrates a patch image used in a maximum toner amount control.
Figure 6:
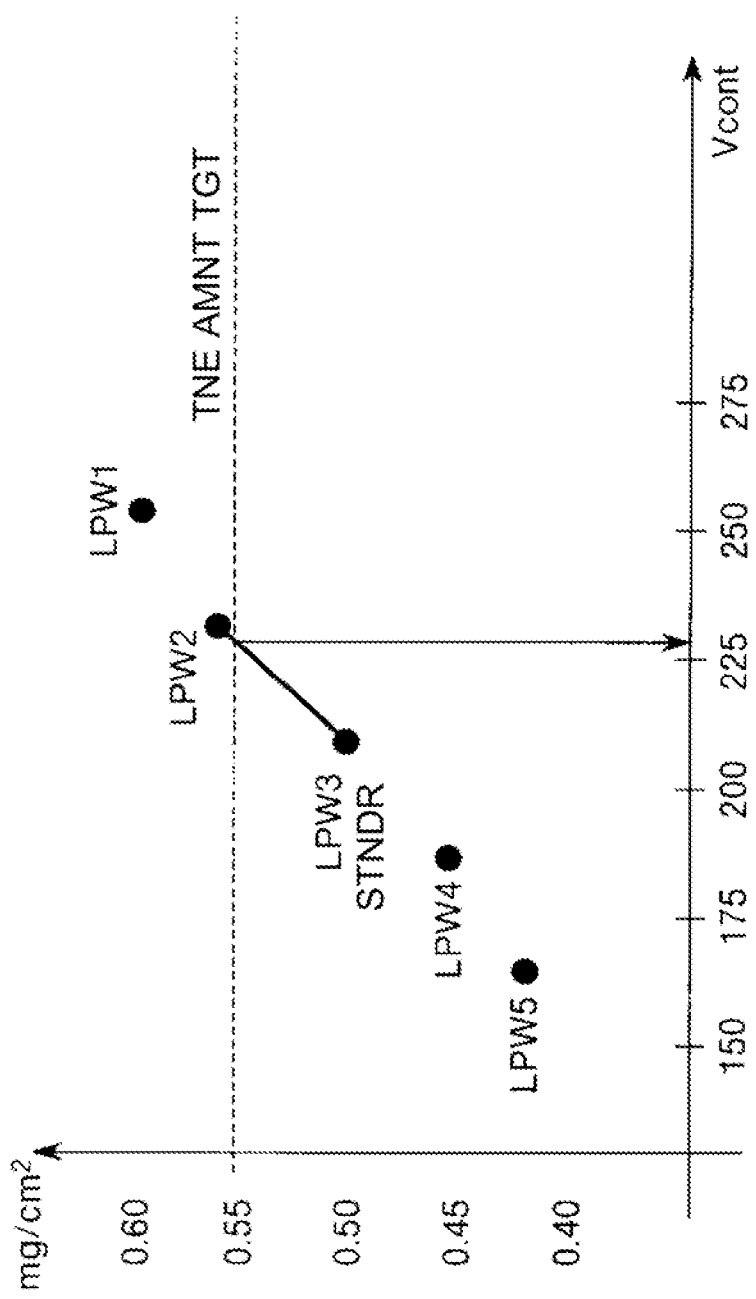
FIG. 6 illustrates a concept of the maximum toner amount control.
Figure 7A:
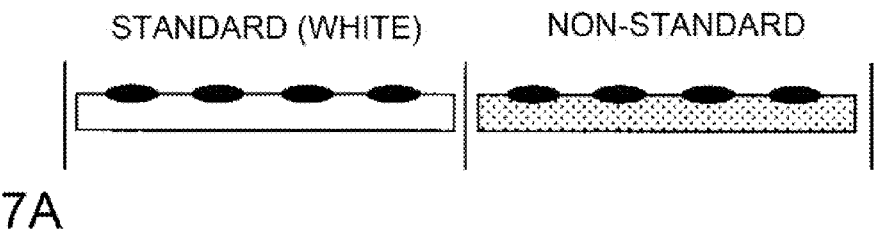
FIGS. 7A, 7B and 7C illustrate difference of color of the paper.
Figure 7B:
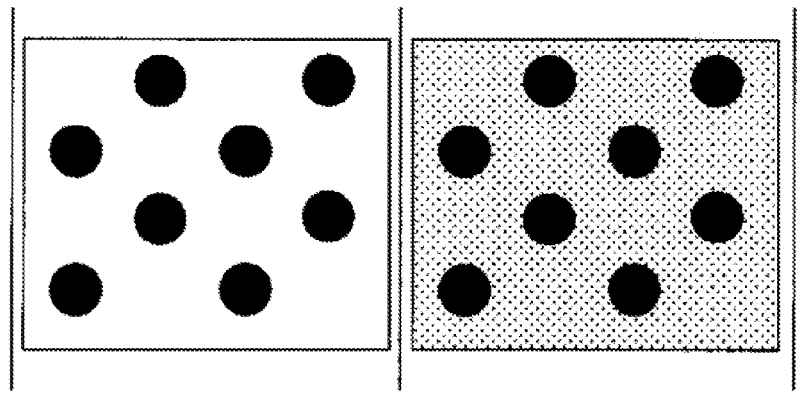
Figure 7C:
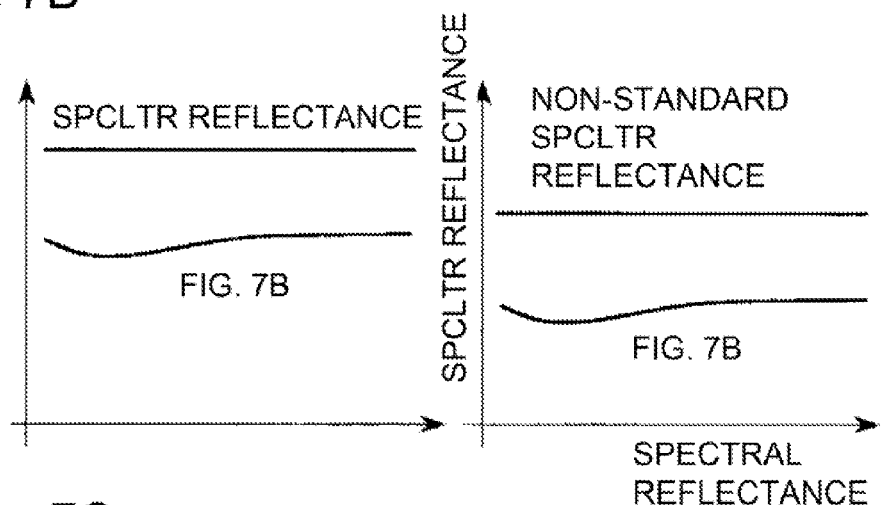
Figure 8:
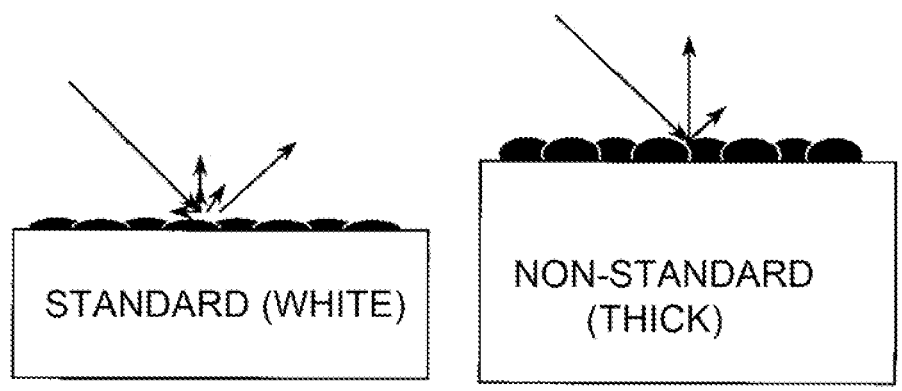
FIG. 8 is a schematic view illustrating a relation between the difference of the paper thickness and the reflectance.
Figure 9:
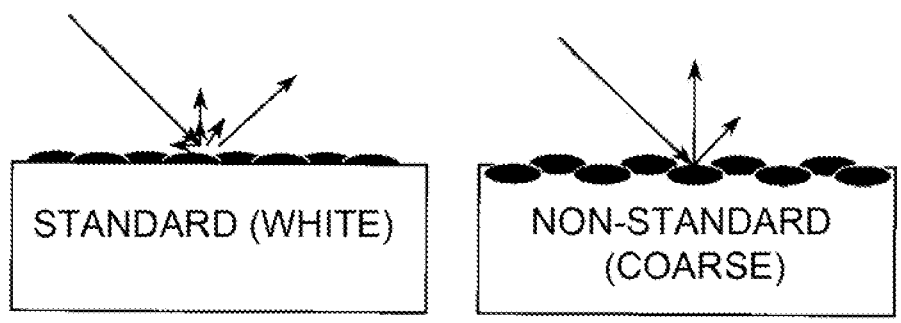
FIG. 9 is a schematic view illustrating a relation between the difference of the paper unsmoothness and the reflectance.
Figure 10:
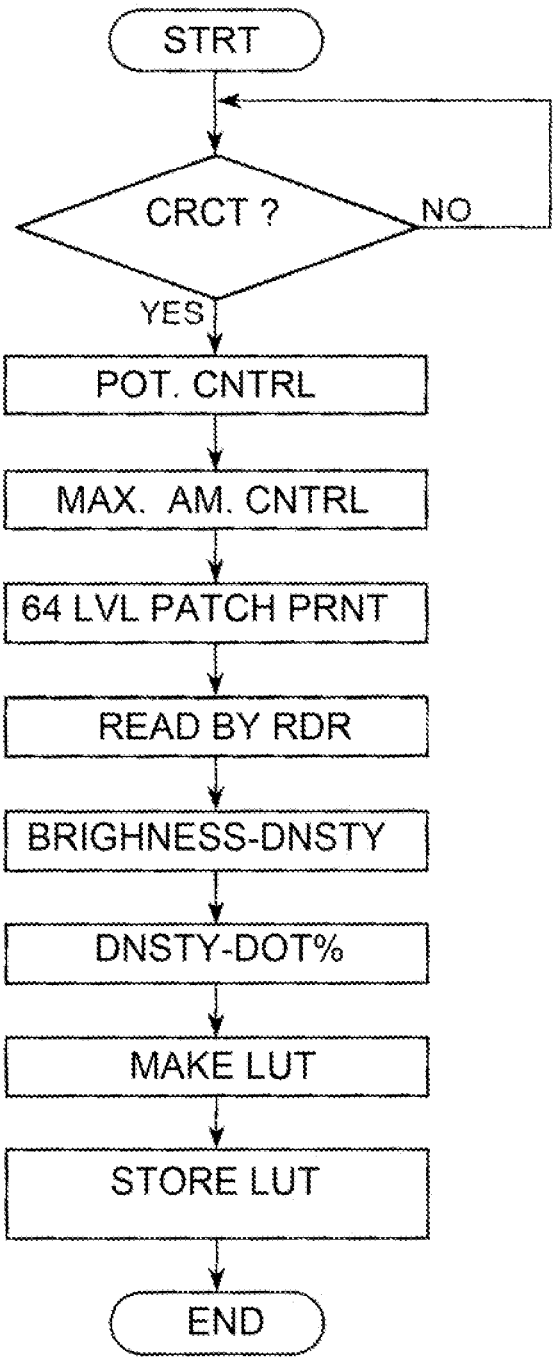
FIG. 10 is a flow chart illustrating a control manner in the image forming apparatus according to the embodiment.
Figure 11:
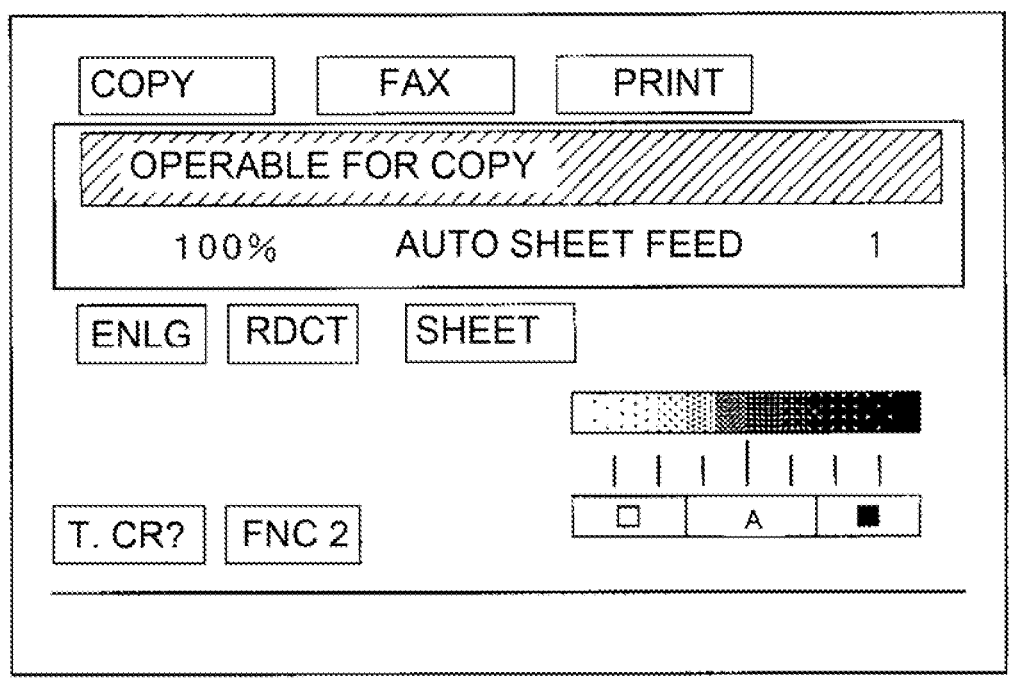
FIG. 11 illustrates an example of an operation screen of the image forming apparatus.
Figure 12:
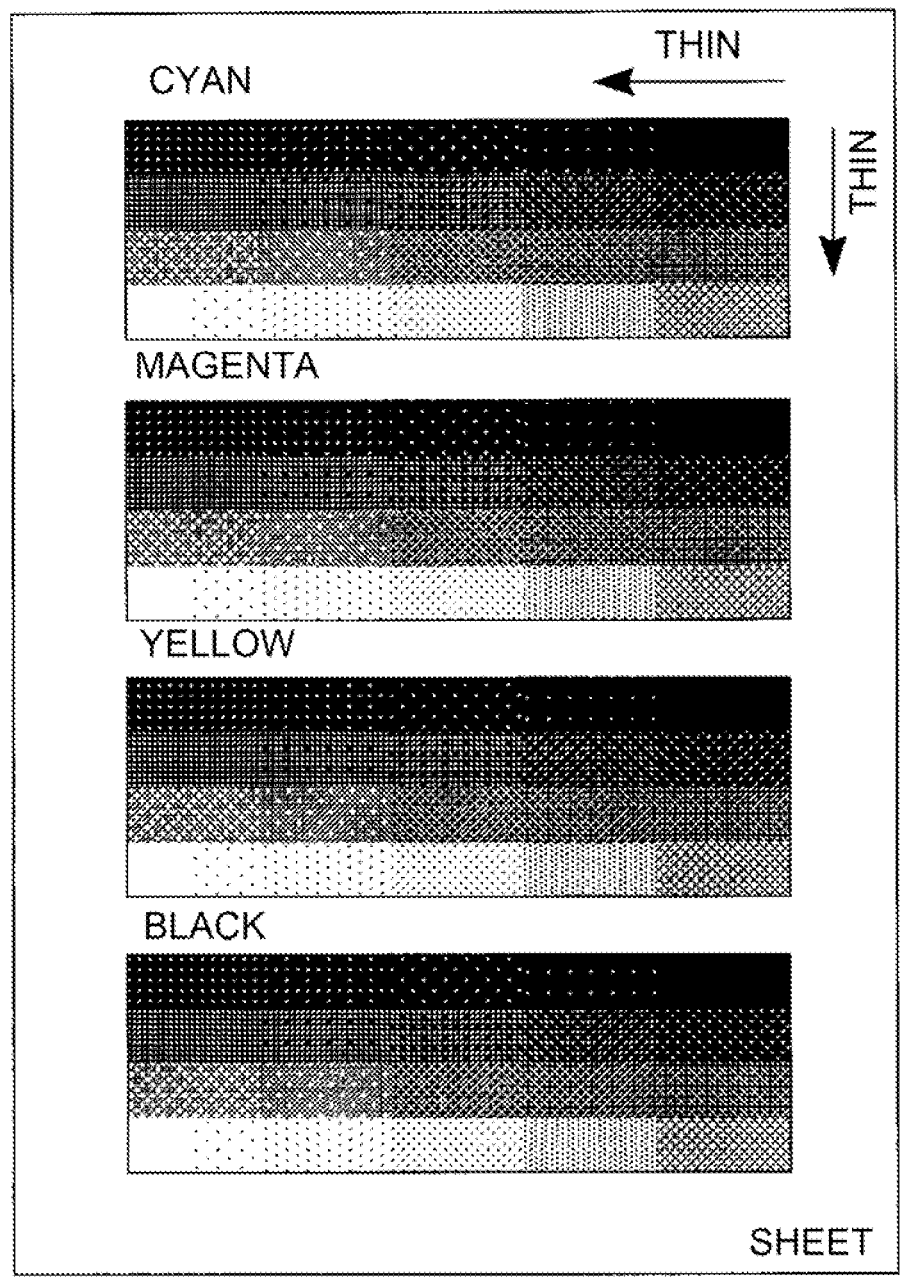
FIG. 12 shows an example of an automatic tone gradation correcting pattern.
Figure 13:
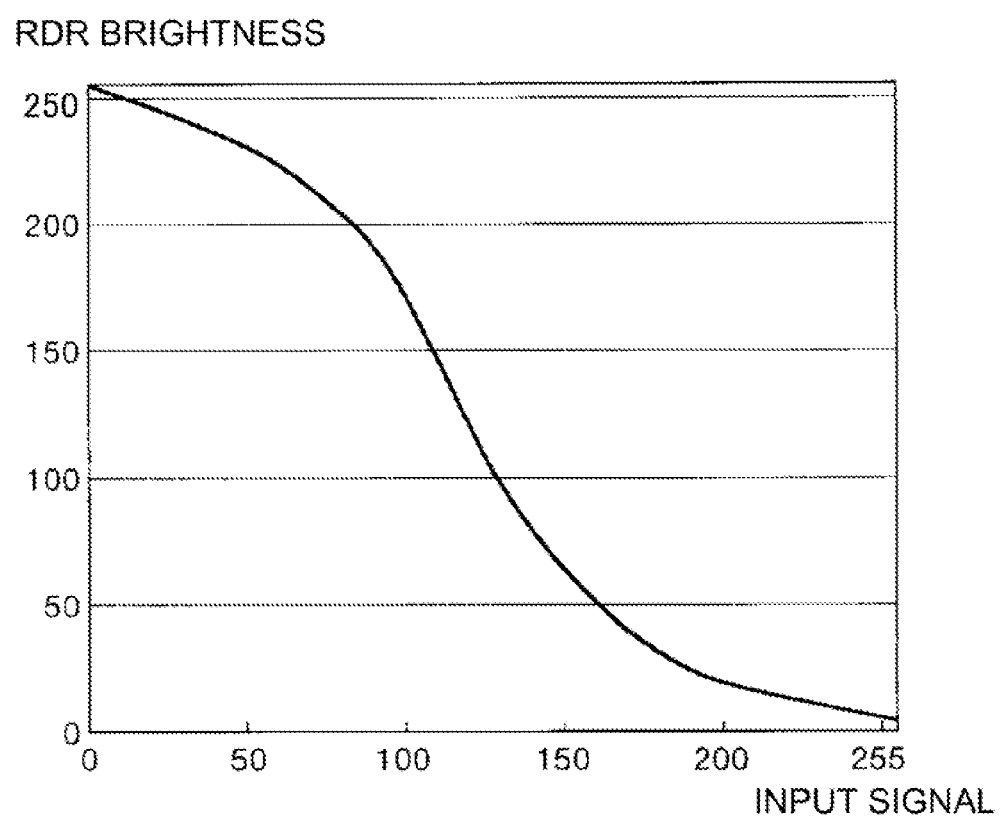
FIG. 13 is a brightness property when the automatic tone gradation correcting pattern is read by the reader portion.
Figure 14:
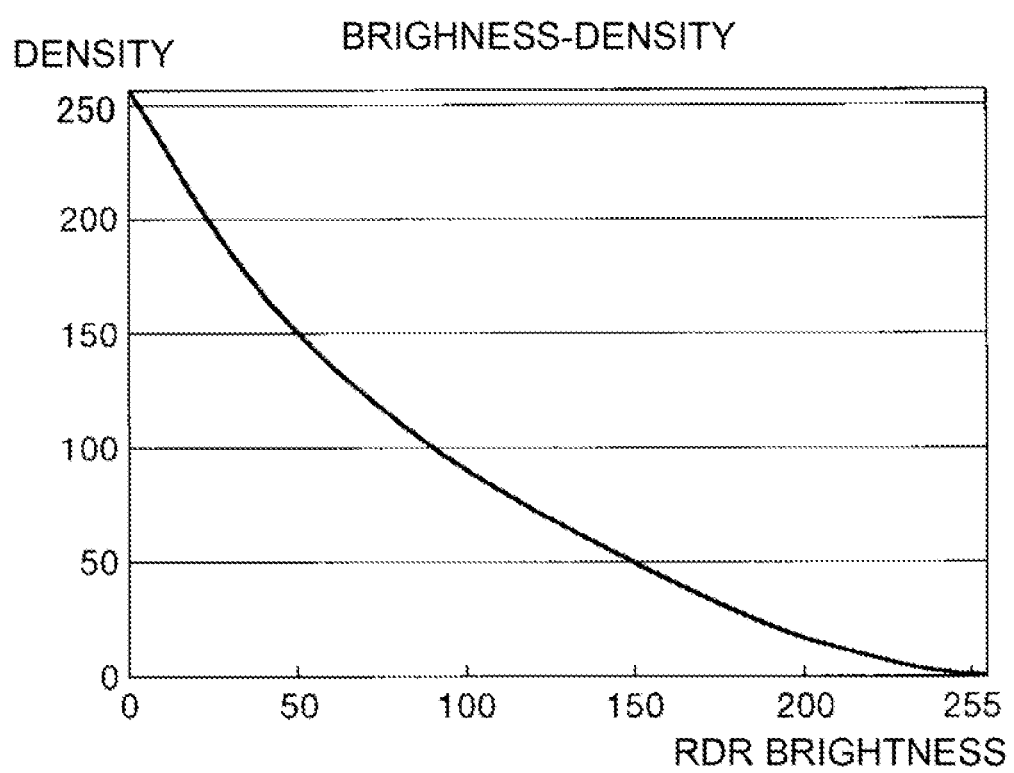
FIG. 14 shows a relation between the brightness obtained by the reader portion.
Figure 15:
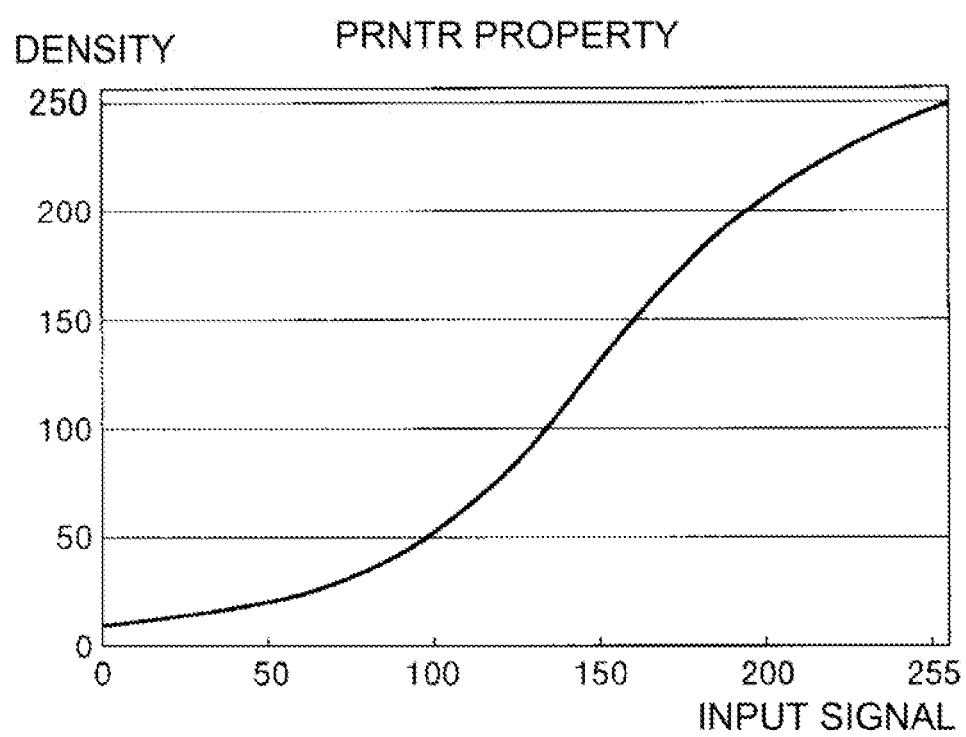
FIG. 15 shows a density property obtained by reading the automatic tone gradation correcting pattern by the reader portion.
Figure 16:
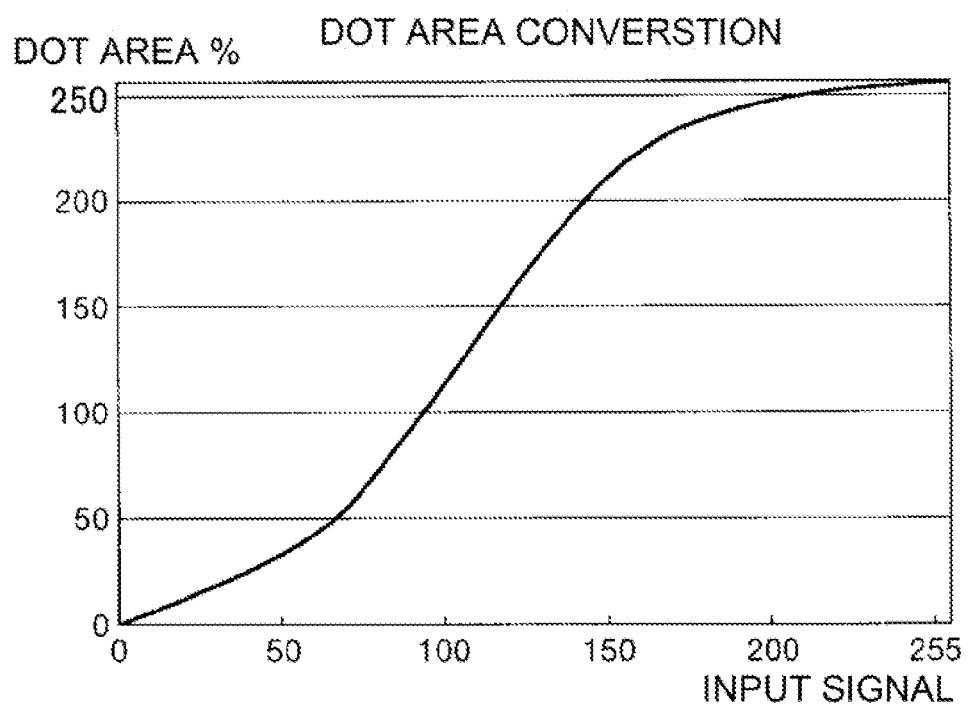
FIG. 16 shows a halftone dot area percentage property obtained by reading the automatic tone gradation correcting pattern by the reader portion.
Figure 17:
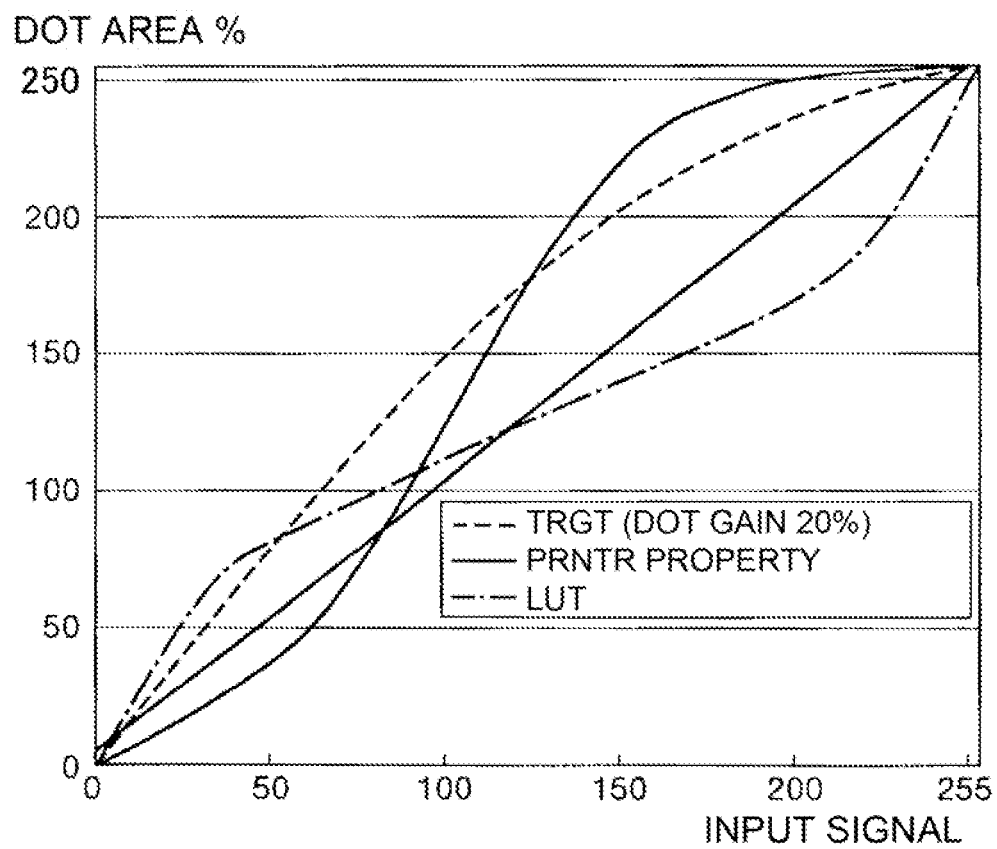
FIG. 17 shows a printer tone gradation property, a LUT and a target.
Figure 18:
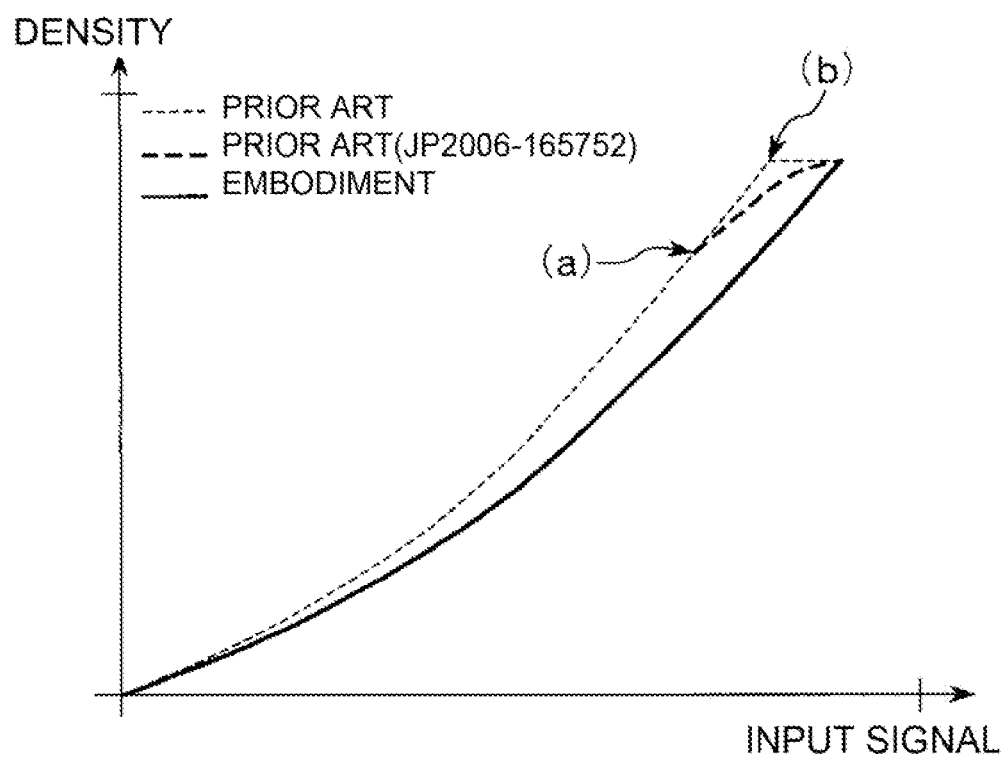
FIG. 18 shows results of printer tone gradation properties in the conventional example and according to the present invention.
Figure 19:
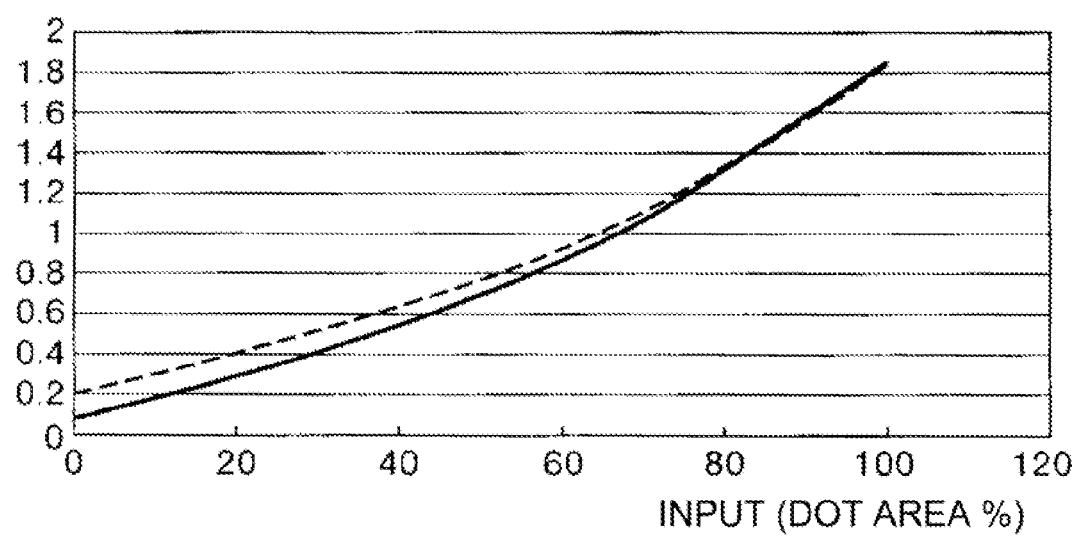
FIG. 19 shows a relation between an input signal in verification of Embodiment 1 and a density.
Figure 20:
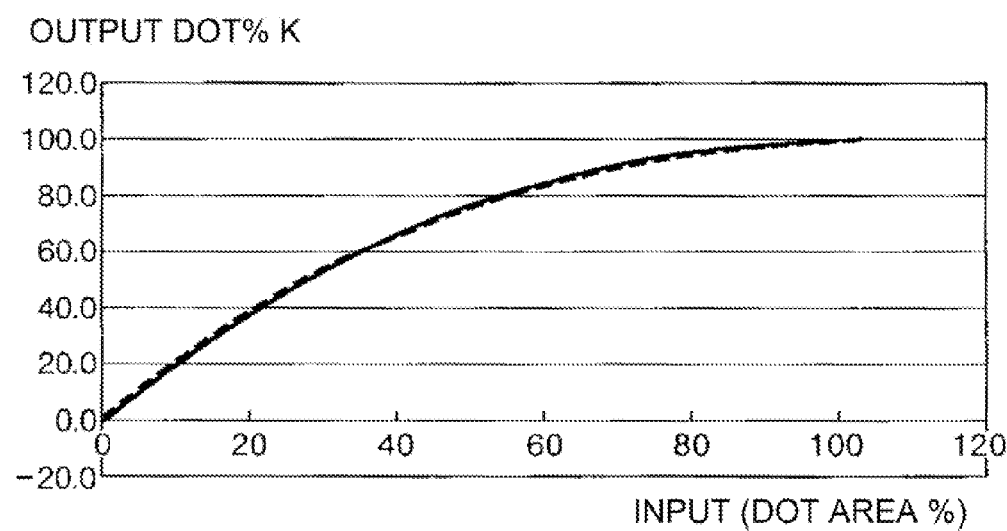
FIG. 20 shows a relation between the input signal in the verification of Embodiment 1 and a halftone dot area percentage.
Figure 21:
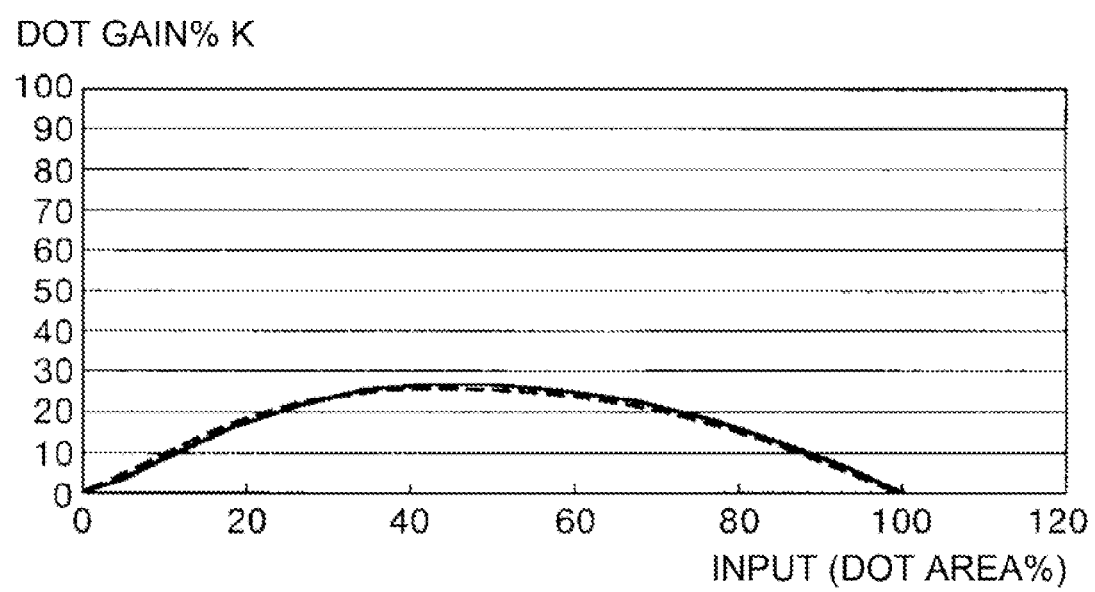
FIG. 21 shows a result of the automatic tone gradation correction in the verification of Embodiment 1.
Figure 22:
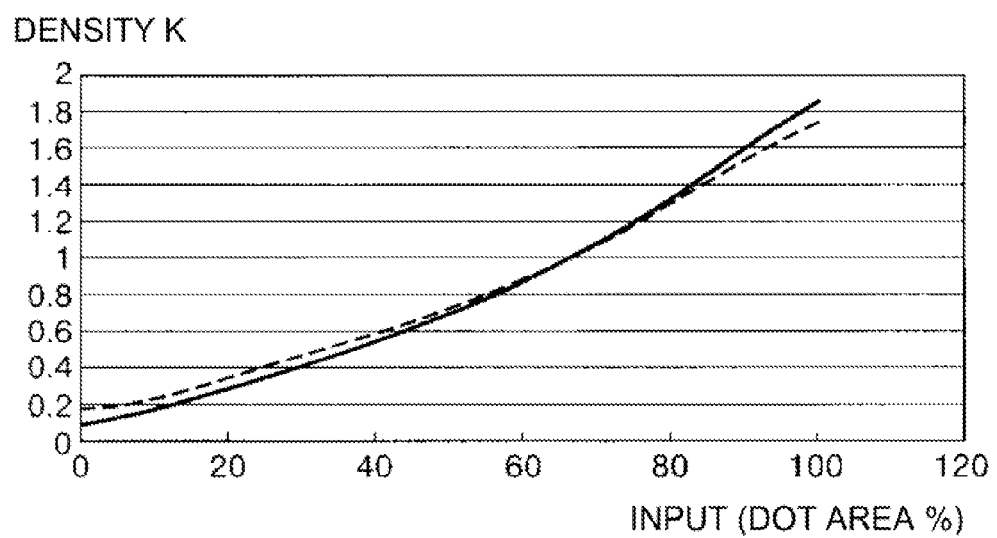
FIG. 22 shows a relation below an input signal in Embodiment 2 and a density.
Figure 23:
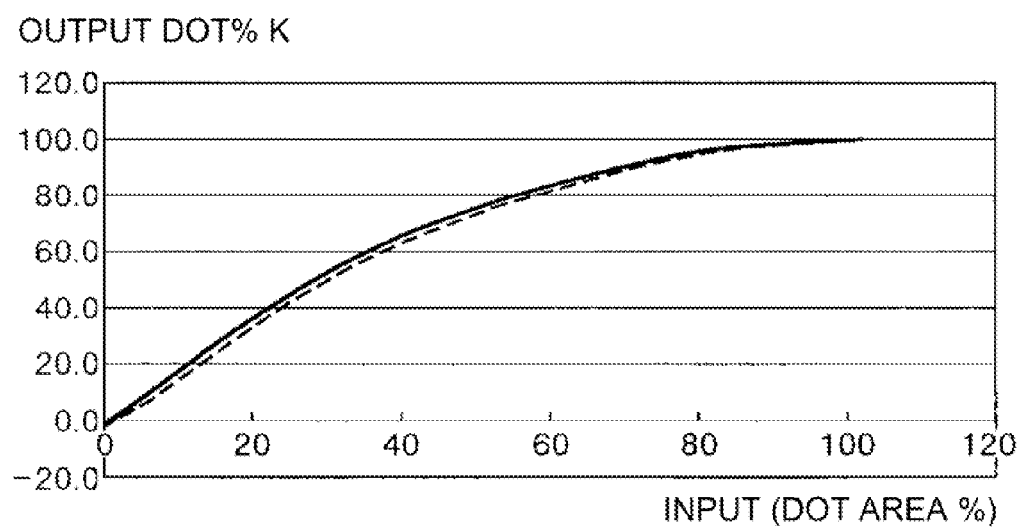
FIG. 23 shows an input signal determined by a calculating method for the halftone dot area percentage and a halftone dot area percentage in Embodiment 1.
Figure 24:
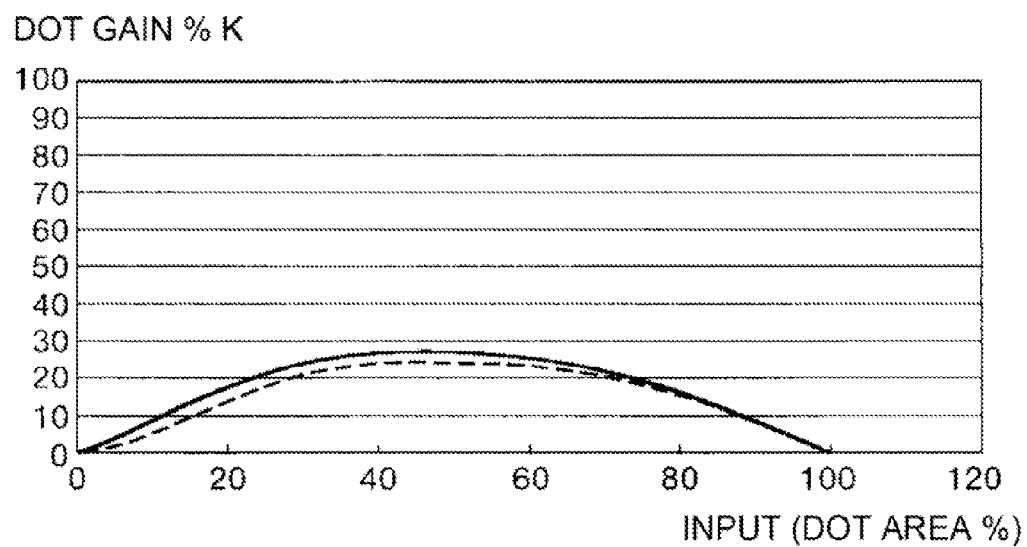
FIG. 24 shows a result of the automatic tone gradation correction by the halftone dot area percentage calculating method according to Embodiment 1.
Figure 25:
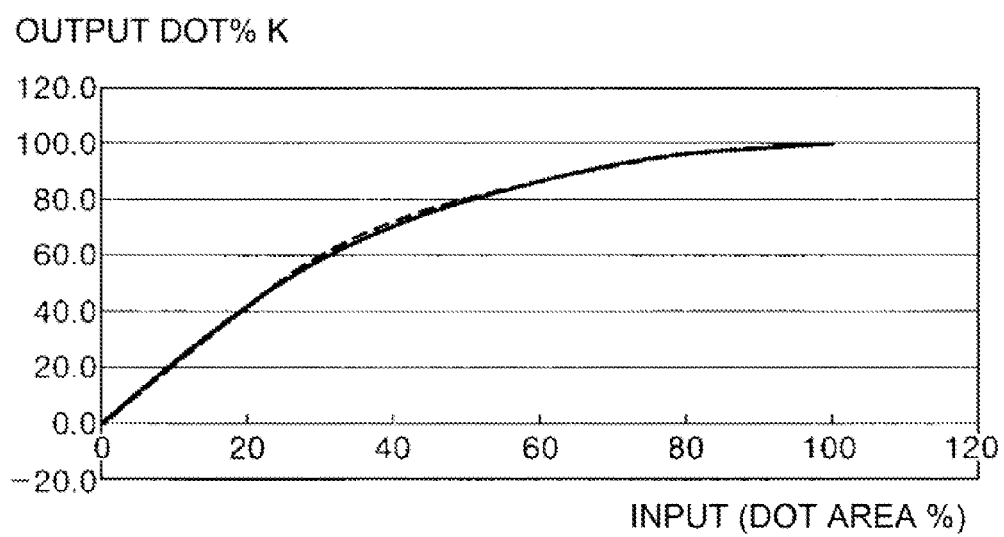
FIG. 25 shows a result of the automatic tone gradation correction in Embodiment 2.
Figure 26:
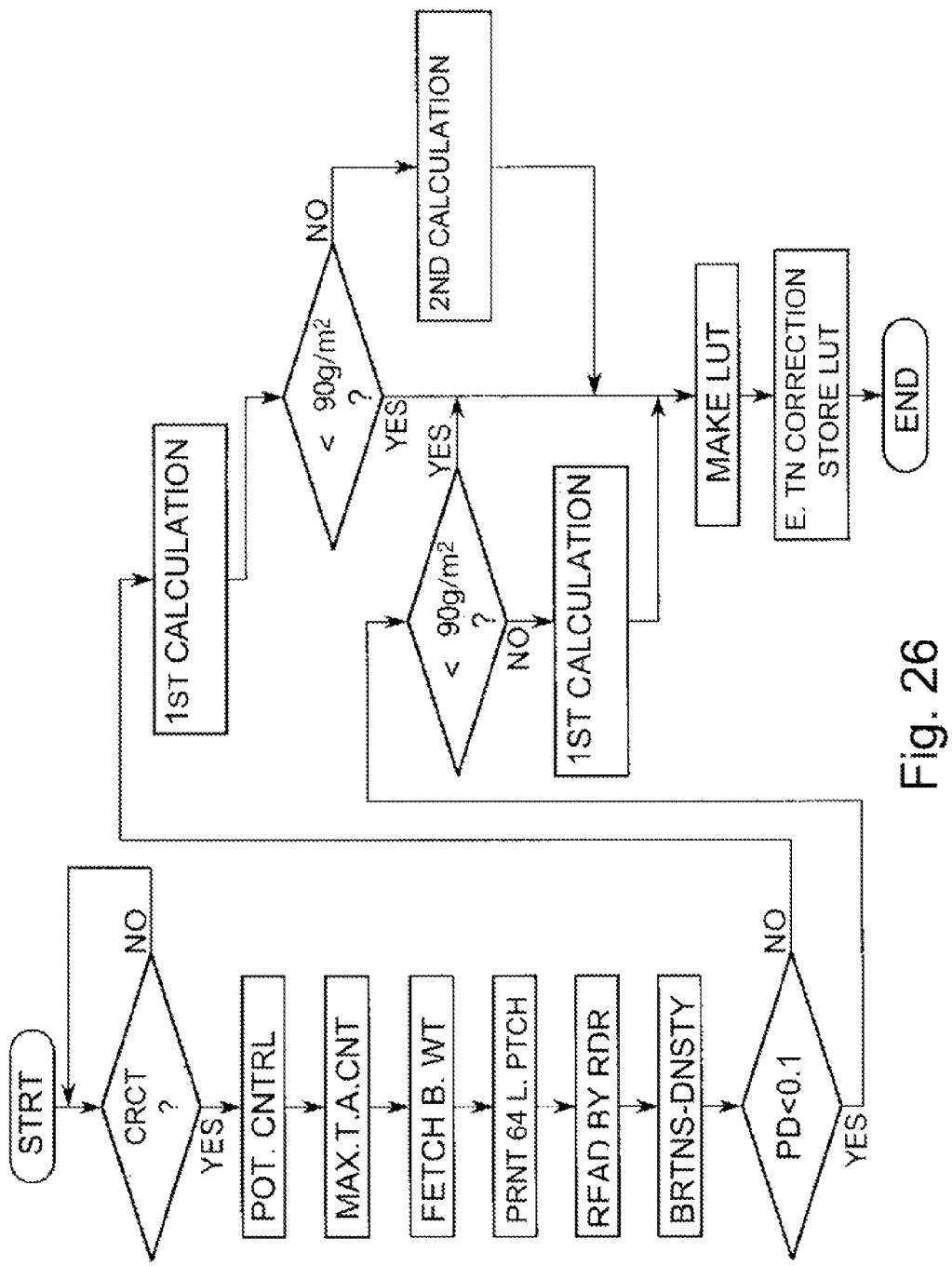
FIG. 26 is a flow chart illustrating Embodiment 3.
Figure 27:
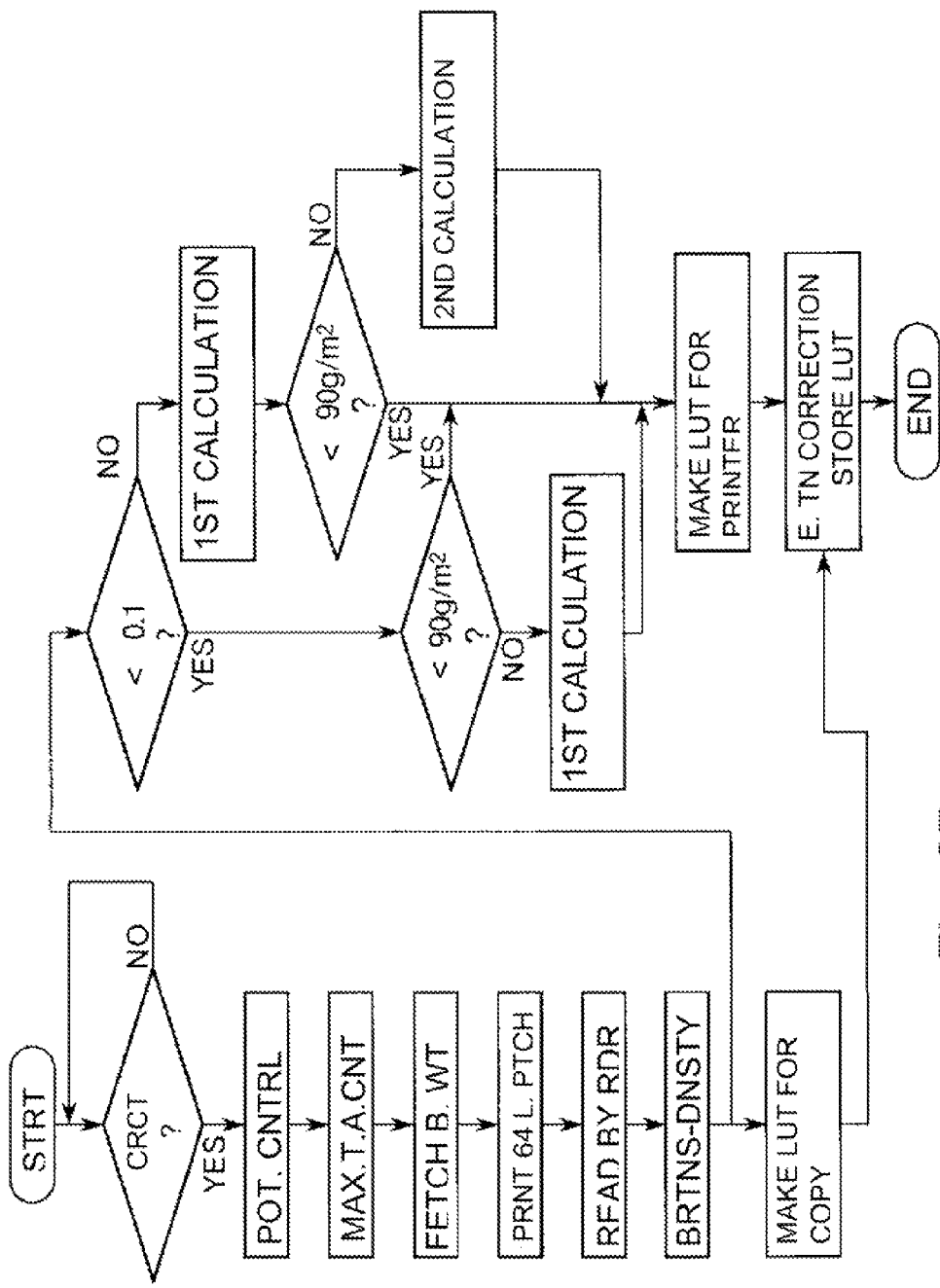
FIG. 27 is a flow chart illustrating Embodiment 4.
Figure 28:
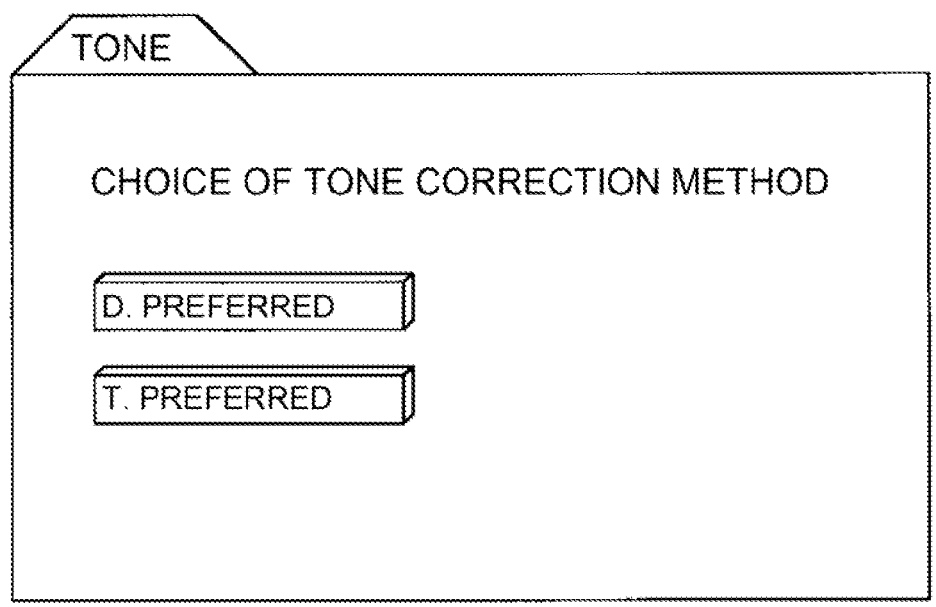
FIG. 28 illustrates a user interface for the tone gradation correcting process instructions in Embodiment 5.
Figure 29:
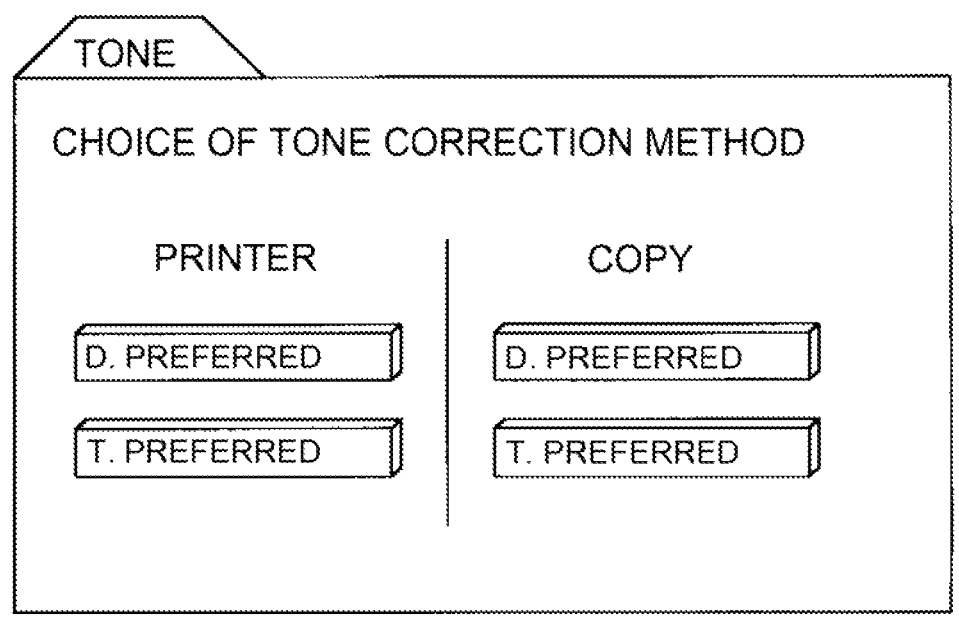
FIG. 29 is an illustration of a user interface for the tone gradation correcting process instructions for a copier and a printer.
Figure 30:
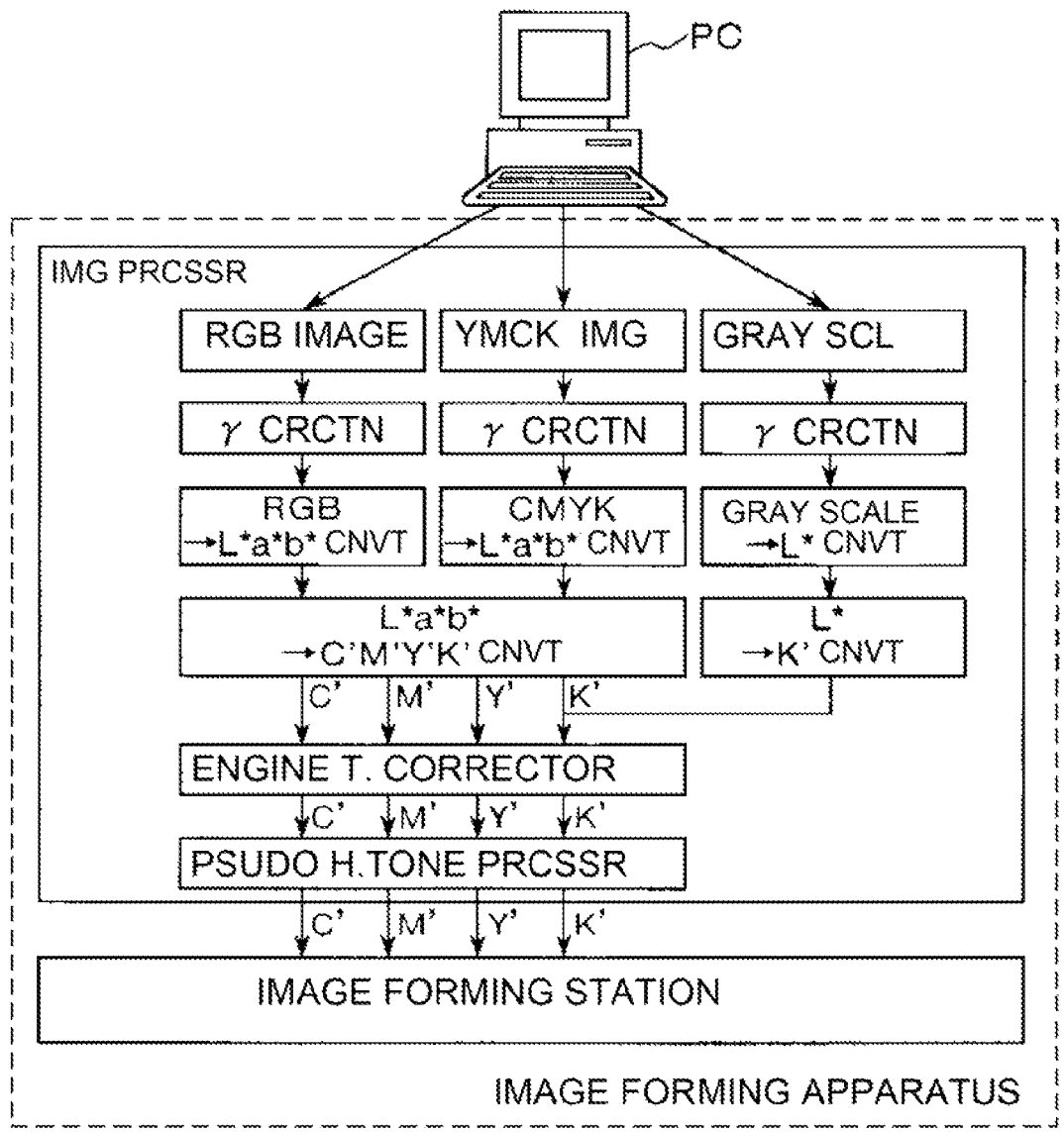
FIG. 30 shows inside structures of a conventional image processor.
Figure 31:
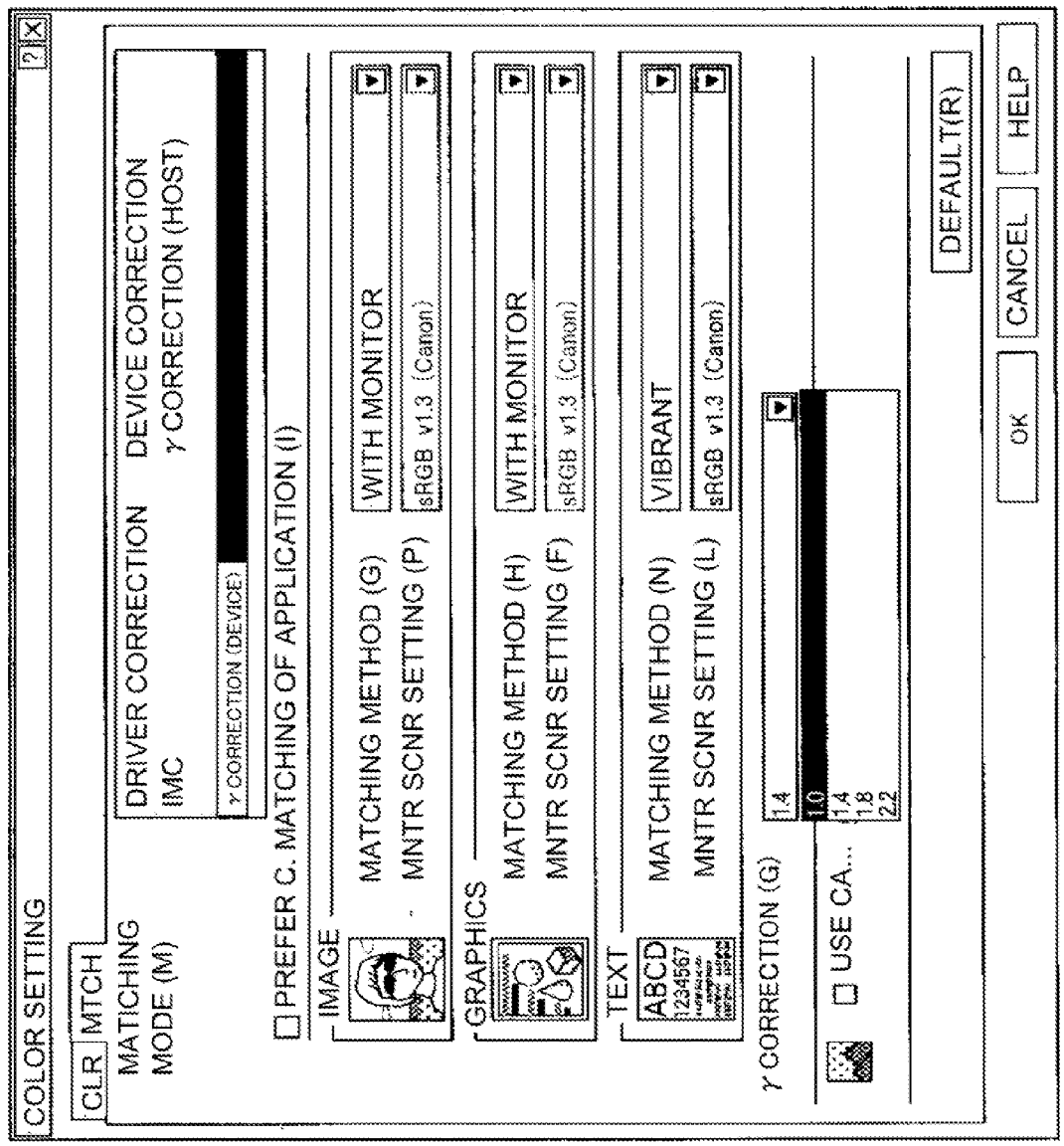
FIG. 31 shows a color setting portion of a conventional printer driver.
Figure 32:
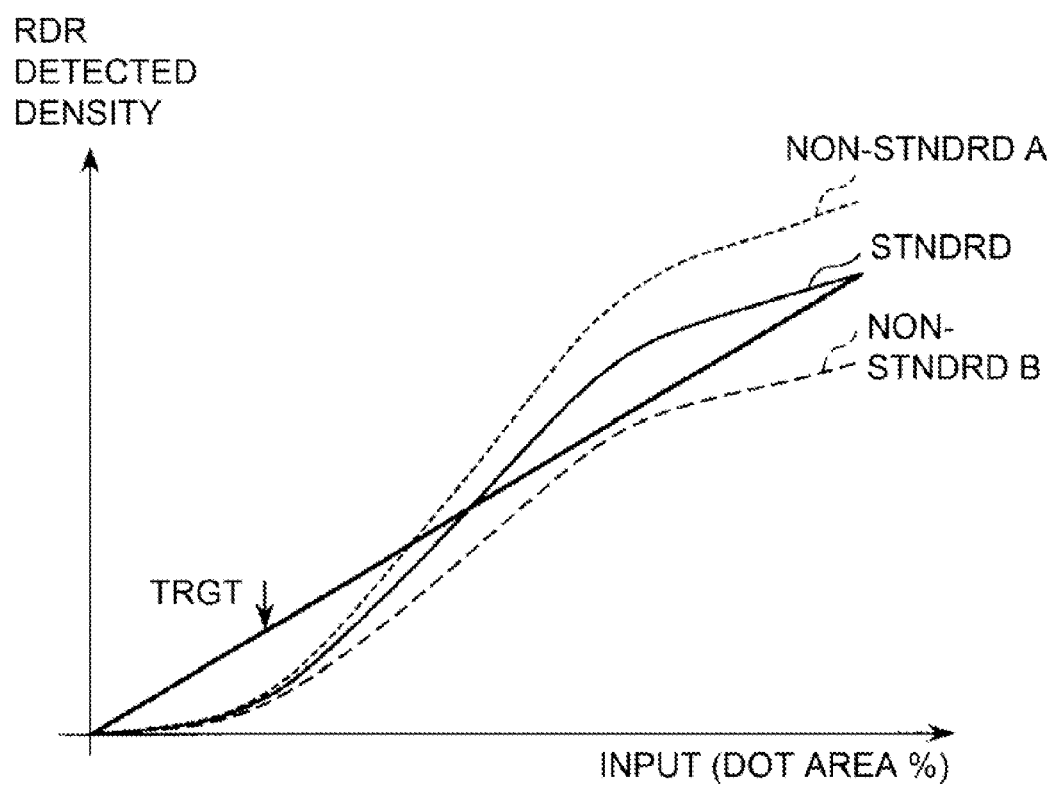
FIG. 32 shows a kind of paper and a density property in a conventional example.
Figure 33:
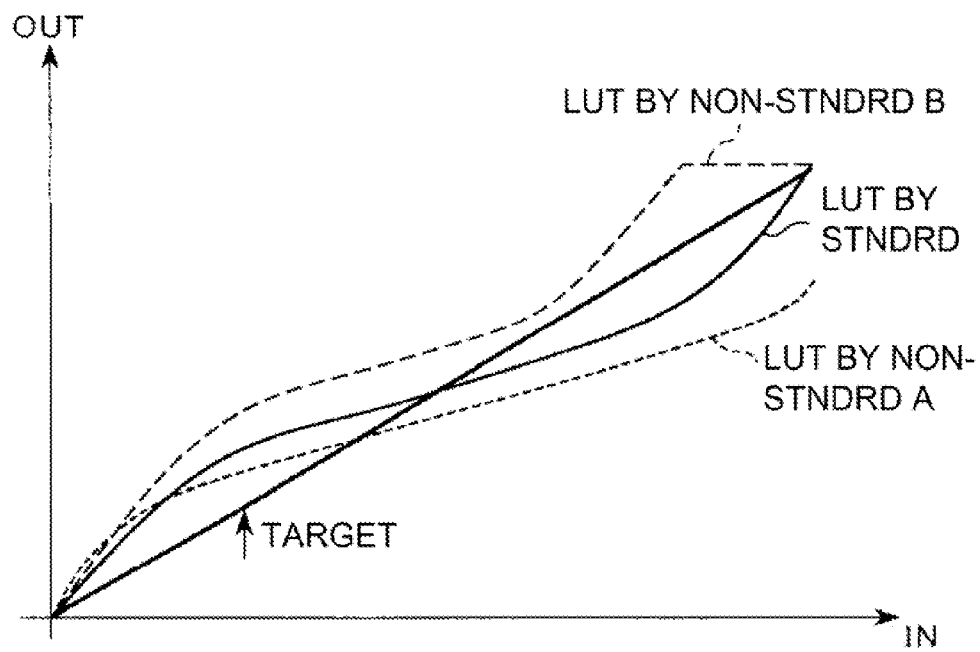
FIG. 33 shows a LUT when an automatic tone gradation correction is carried out.
Figure 34:
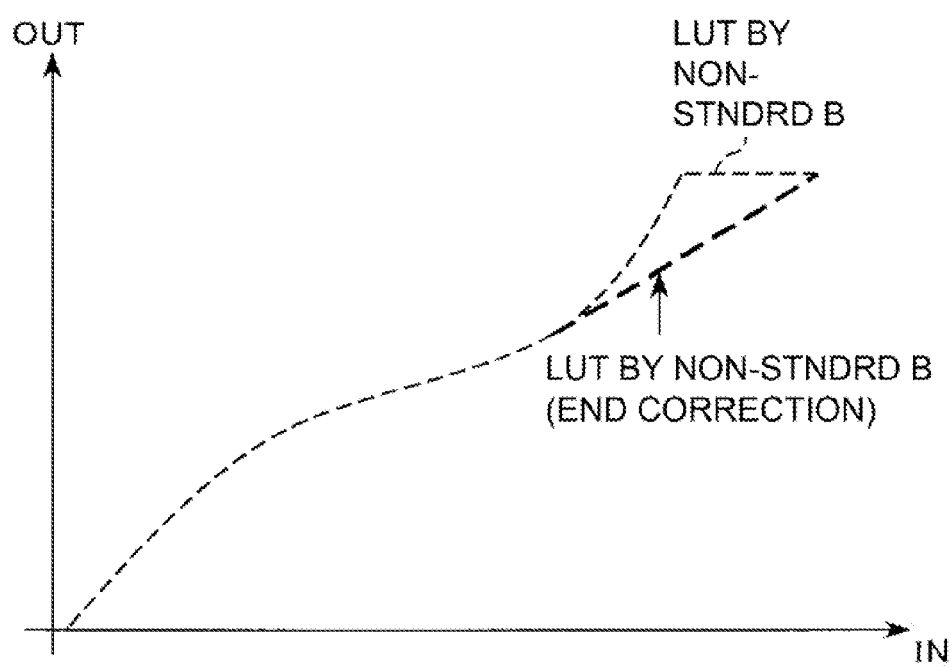
FIG. 34 shows a LUT when an automatic tone gradation correction is carried out.
Figure 35:
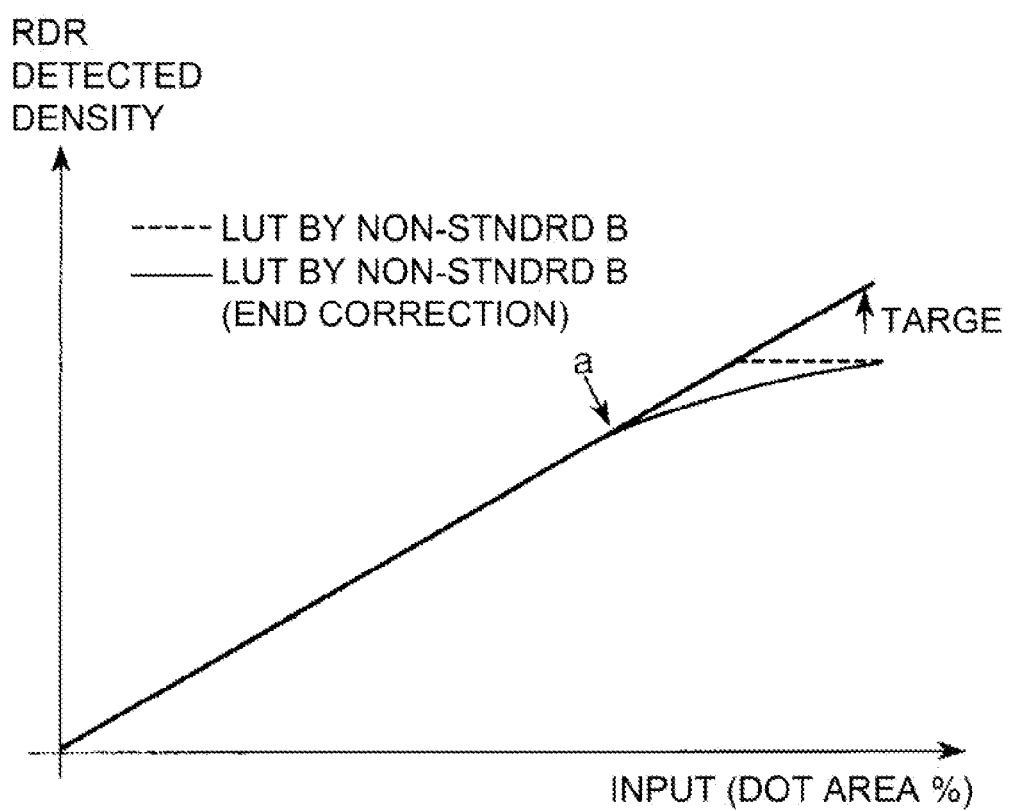
FIG. 35 shows a result of correction when the conventional automatic tone gradation correction is carried out.

According to the present invention, there is provided an image forming apparatus with which high image quality is accomplished by suppressing image defect by the high usability engine tone gradation correction without increasing memory cost and without using a standard paper.

The invention claimed is:

1. An image forming apparatus comprising:
   an image forming unit configured to form an image on a recording material with a halftone dot area percentage changed to provide a density corresponding to an input signal;
   a reading unit configured to read a recording material having an image formed by said image forming unit;
   a determining unit configured to determine first data for correcting a relation between an input signal and a density of the image to be formed by said image forming unit and second data for correcting a relation between an input signal and a halftone dot area percentage corresponding to a density of the image to be formed by image forming unit, on the basis of a reading result of the recording material on which a plurality of images having different densities are formed by said image forming unit; and
   a correcting unit configured to correct the input signal before being input to said image forming unit, using one of the first data or the second data determined by said determining unit.

2. The image forming apparatus according to claim 1, wherein said image forming apparatus:
   is operable in a copy mode in which said image forming unit copies an image corresponding to an image of a read original, and in a printer mode in which said image forming unit prints image data received from an external device, and
   further comprises a setting unit configured to set, for each of the copy mode and the printer mode, which of the first data or the second data is to be used by said correcting unit to correct the input signal before being input to said image forming unit.

3. The image forming apparatus according to claim 2, wherein:
   said setting unit includes a manually operable selection unit configured to select which of the first data or the second data is to be used by said correcting unit to correct the input signal, and
   said setting unit is operable to set, for each of the copy mode and the printer mode, for said correcting unit to correct the input signal using the data selected by said selection unit.

4. The image forming apparatus according to claim 1, wherein:
   said image forming apparatus is operable in a copy mode in which said image forming unit copies an image corresponding to an image of a read original, and in a printer mode in which said image forming unit prints image data received from an external device, and
   said correcting unit is configured to correct:
      the input signal before being input to said image forming unit, using the first data in the copy mode, and
      the input signal before being input to said image forming unit, using the second data in the printer mode.

5. The image forming apparatus according to claim 1, wherein said correcting unit is configured to correct:
   the input signal using the first data, for the recording material having a background density less than a threshold, and
   the input signal using the second data, for the recording material having a background density not less than the threshold.

6. The image forming apparatus according to claim 1, wherein said correcting unit is configured to correct:
   the input signal using the first data, for a recording material having a basis weight less than a predetermined value, and
   the input signal using the second data, for a recording material having a basis weight not less than the predetermined value.

7. The image forming apparatus according to claim 1, wherein said correcting unit is configured to correct:
   the input signal using the first data, for a recording material having a background density less than a threshold and having a basis weight less than a predetermined value, and
   the input signal using the second data, for a recording material having a background density not less than the threshold or a basis weight not less than the predetermined value.

8. An image forming apparatus comprising:
   a correction unit configured to:
      correct image data based on a first tone correction data in a copy mode, and
      correct image data based on a second tone correction data in a printing mode;
   an image forming unit configured to form an image on a recording material based on the image data corrected by the correction unit;
   a controller configured to control the image forming unit to form a pattern image;
   a reading unit configured to read the recording material carrying the pattern image;
   a generation unit configured to:
      generate the first tone correction data based on a pattern image data contained in a reading result of the reading unit, and
      generate the second tone correction data based on the pattern image data and a density of the recording material corresponding to the reading result of the reading unit.

9. The image forming apparatus according to claim 8, wherein the generation unit is configured to:
    convert the pattern image data to density data and generate the first toner correction data based on the density data, and
    convert the pattern image data to halftone dot area percentage data based on high density pattern image data contained in the pattern image data and the density of the recording material, and generate the second tone correction data based on the halftone dot area percentage data.

10. The image forming apparatus according to claim 8, wherein the density of the recording material corresponds to the reading result of a non-image area of the recording material.

11. The image forming apparatus according to claim 8, wherein the high density pattern image data is data corresponding to a maximum density among the pattern image data.

12. The image forming apparatus according to claim 8, wherein in the copy mode, said image forming unit forms a copy image corresponding to an original read by said reading unit, and in the printing mode, said image forming unit forms a print image on the basis of the image data input from an external device.

13. The image forming apparatus according to claim 8, wherein the halftone dot area percentage data is determined according to:

$$\{1-10^{(-Dt)}\}/\{1-10^{(-Ds)}\} \times 100,$$

$$Ds = D\text{max} - Dp, \text{ and}$$

$$Dt = D - Dp,$$

where:
  Dmax is the density data converted from the high density pattern image data,
  Dp is the density data converted from the background data, and
  D is the density data converted from the pattern image data.

14. The image forming apparatus according to claim 8, wherein the halftone dot area percentage data is determined according to:

$$\{1-10^{(-Dt2)}\}/\{1-10^{(-Ds2)}\} \times 100,$$

$$Ds2 = D\text{max} - Dp \times (100-N),$$

$$Dt2 = D - Dp \times (100-N),$$

$$N = \{1-10^{(-Dt)}\}/\{1-10^{(-Ds)}\} \times 100,$$

$$Ds = D\text{max} - Dp, \text{ and}$$

$$Dt = D - Dp,$$

where:
  Dmax is the density data converted from the high density pattern image data,
  Dp is the density data converted from the background data,
  D is the density data converted from the pattern image data.

15. The image forming apparatus according to claim 8, wherein the generation unit is configured to generation the second tone correction data based on a target curve corresponding to a predetermined dot gain property.

16. The image forming apparatus according to claim 8, wherein:
    the halftone dot area percentage is calculated using a density of the pattern image and a correction value that depends on the density of the pattern image,
    a first correction value corresponding to a first density of the pattern image is smaller than a second correction value corresponding to a second density of the pattern image that is lower than the first density.

* * * * *